United States Patent [19]
Ayata et al.

[11] Patent Number: 4,707,713
[45] Date of Patent: Nov. 17, 1987

[54] IMAGE RECORDING APPARATUS

[75] Inventors: Naoki Ayata, Machida; Seiji Saito, Yokosuka; Hidetoshi Suzuki; Kunitaka Ozawa, both of Tokyo; Noboru Koumura, Narashino, all of Japan

[73] Assignee: Canon Kabushiki Kaisha, Tokyo, Japan

[21] Appl. No.: 796,536

[22] Filed: Nov. 12, 1985

Related U.S. Application Data

[63] Continuation of Ser. No. 433,969, Oct. 13, 1982, abandoned.

[30] Foreign Application Priority Data

Oct. 19, 1981 [JP] Japan ................. 56-165617
Oct. 19, 1981 [JP] Japan ................. 56-165618
Oct. 19, 1981 [JP] Japan ................. 56-165619
Oct. 19, 1981 [JP] Japan ................. 56-165620

[51] Int. Cl.$^4$ ............... G01D 15/16; G03G 15/01
[52] U.S. Cl. ................ 346/140 R; 346/75; 346/160; 355/7; 355/4
[58] Field of Search ............... 355/3 R, 4, 7, 14 R; 346/75, 134, 140 R, 160

[56] References Cited

U.S. PATENT DOCUMENTS

| | | | |
|---|---|---|---|
| 4,045,218 | 8/1977 | McVeigh | 355/7 X |
| 4,165,165 | 8/1979 | Iwami et al. | 355/4 |
| 4,168,118 | 9/1979 | Mir | 355/4 |
| 4,204,728 | 5/1980 | Goshima et al. | 355/4 |
| 4,315,685 | 2/1982 | Inuzuka et al. | 355/14 R |
| 4,398,816 | 8/1983 | Nakajima et al. | 355/7 X |
| 4,413,899 | 11/1983 | Karasawa et al. | 355/4 |
| 4,417,805 | 11/1983 | Kishi | 355/141 R |

Primary Examiner—Fred L. Braun
Attorney, Agent, or Firm—Fitzpatrick, Cella, Harper & Scinto

[57] ABSTRACT

An image recording apparatus having a mechanism for registering at least one recording mode, for example a frequently-used basic mode or a color mode, and having a mechanism for setting another mode to be used for recording in a particular instance. In another aspect, the apparatus has a mechanism for setting a respective recording mode for each of a plurality of image areas, which areas can themselves be designated.

25 Claims, 36 Drawing Figures

FIG. 2

PROCESSING OF EACH COLOR IMAGE OUT OF FRAME OR IN CASE OF NO SPECIFIED AREA

| | BL→BL, RED→BL | BL→BL, RED→RED | BL→BL, RED→ | BL→RED, RED→BL | BL→RED, RED→RED | BL→RED, RED→ | BL→, RED→BL | BL→, RED→RED | BL→, RED→ |
|---|---|---|---|---|---|---|---|---|---|
| NO SPECIFIED AREA CASE | A | A B | A B C | A B C D | A B C D | A B | C D | | |
| BL→BL, RED→BL | A B C D | A B C D | A B C | A B C D | A B C D | A B C | B C D | B C D | B C |
| BL→BL, RED→RED | A B C D | A B C D | A B C | A B C D | A B C D | A B C | B C D | B C D | B C |
| BL→BL, RED→ | A B | A B | A B | A B | A B | A B | B | B | B |
| BL→RED, RED→BL | A B C D | A B C D | A B C | A B C D | A B C D | A B C | B C D | B C D | B C |
| BL→RED, RE→RED | A B C D | A B C D | A B C | A B C D | A B C D | A B C | B C D | B C D | B C |
| BL→RED, RED→ | A B | A B | A B | A B | A B | A B | B | B | B |
| BL→, RED→BL | C D | A | A C | C D | C D | A C | C D | C D | C |
| BL→, RED→RED | C D | A | A C | C D | C D | A C | C D | C D | C |
| BL→, RED→ | D | A | A | D | D | A | D | D | |

PROCESSING OF EACH COLOR IMAGE IN FRAME

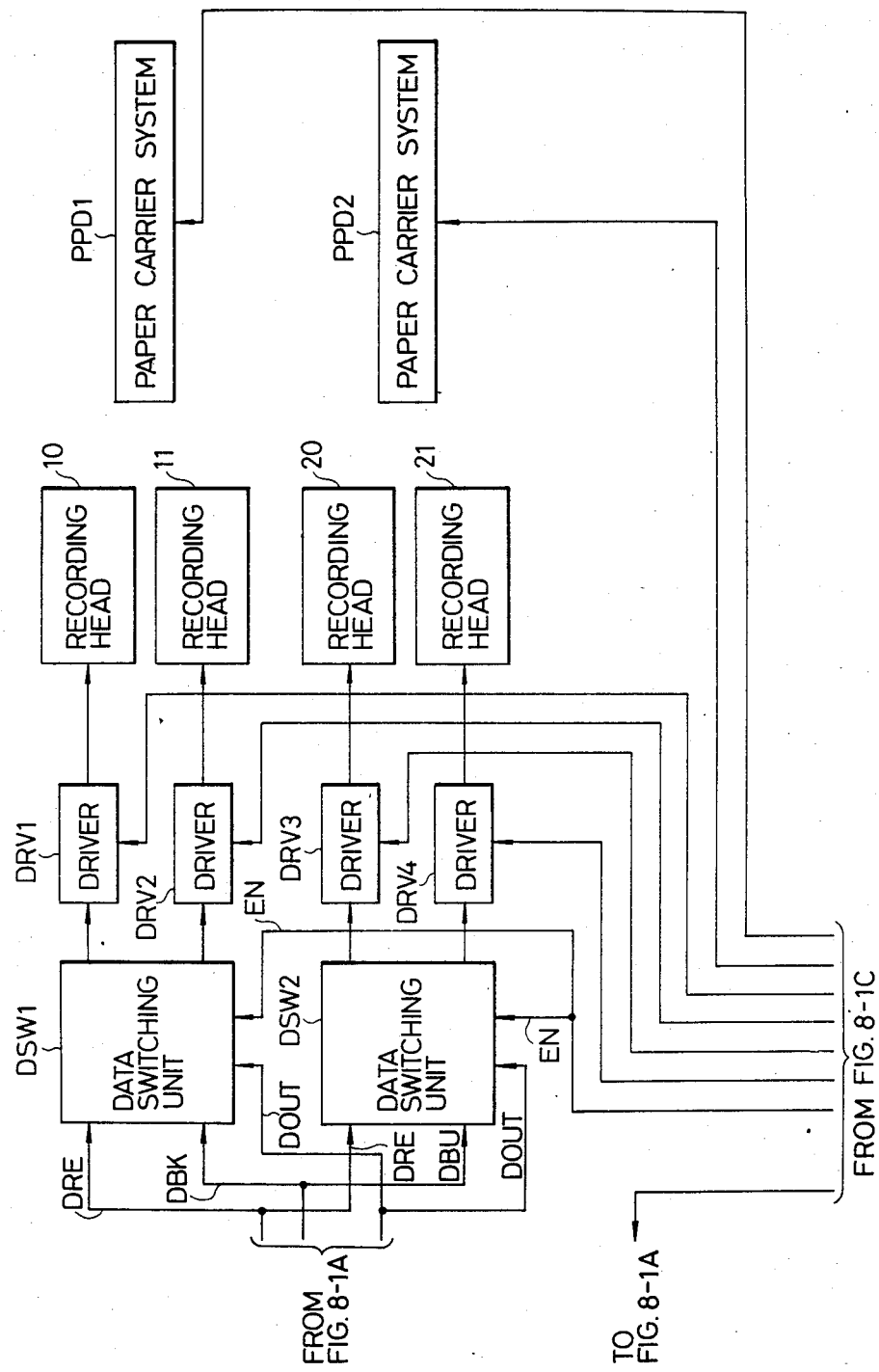

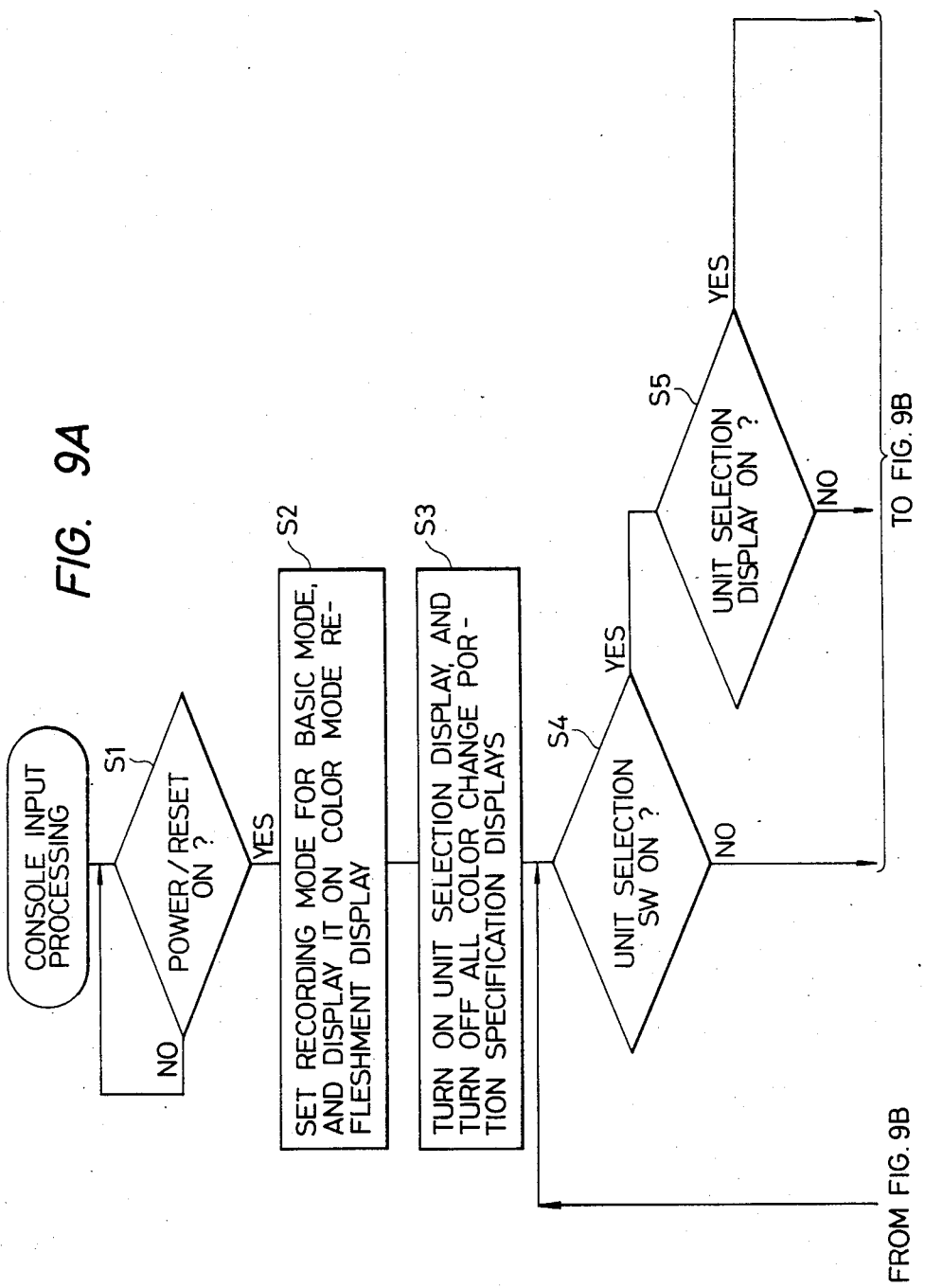

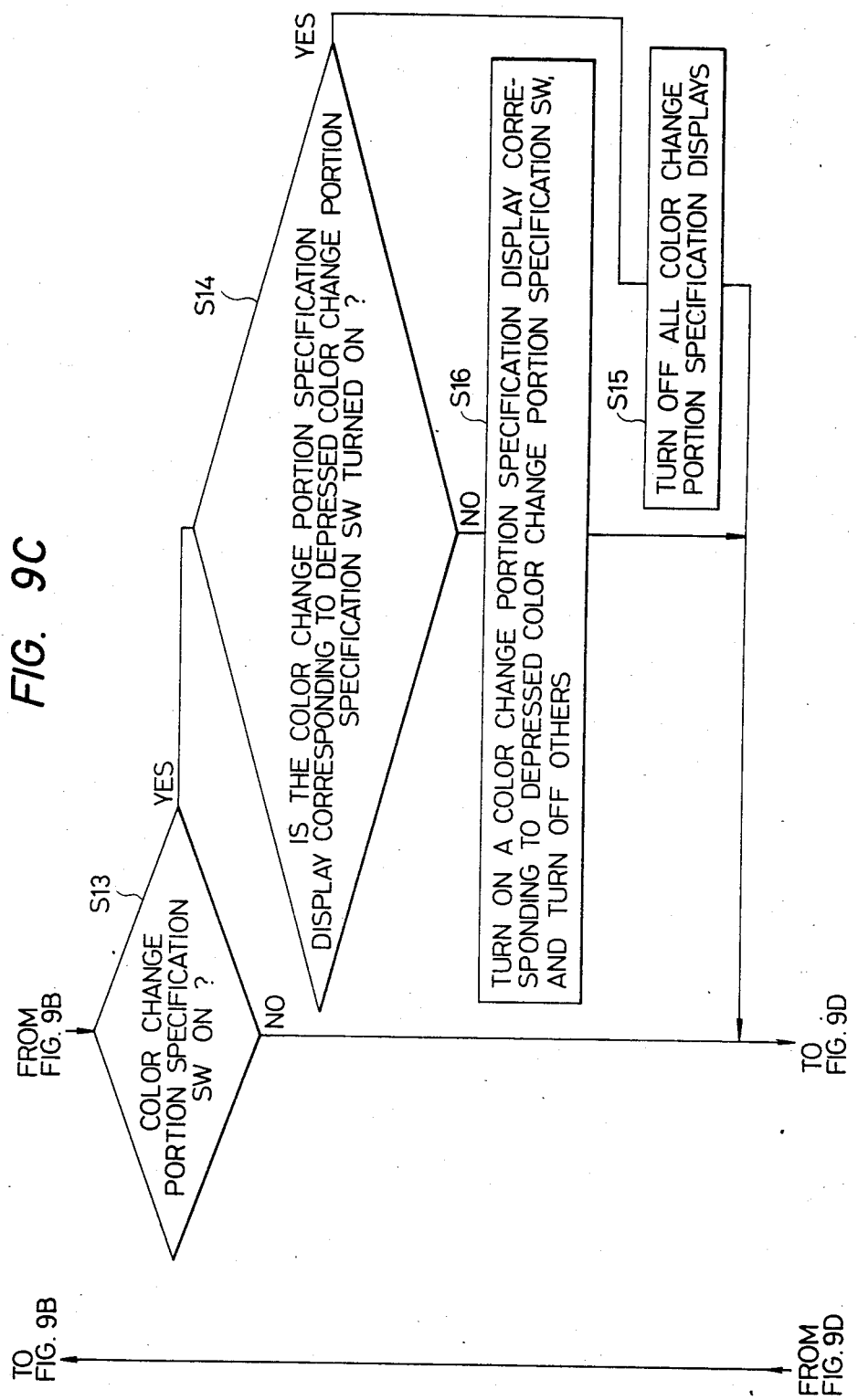

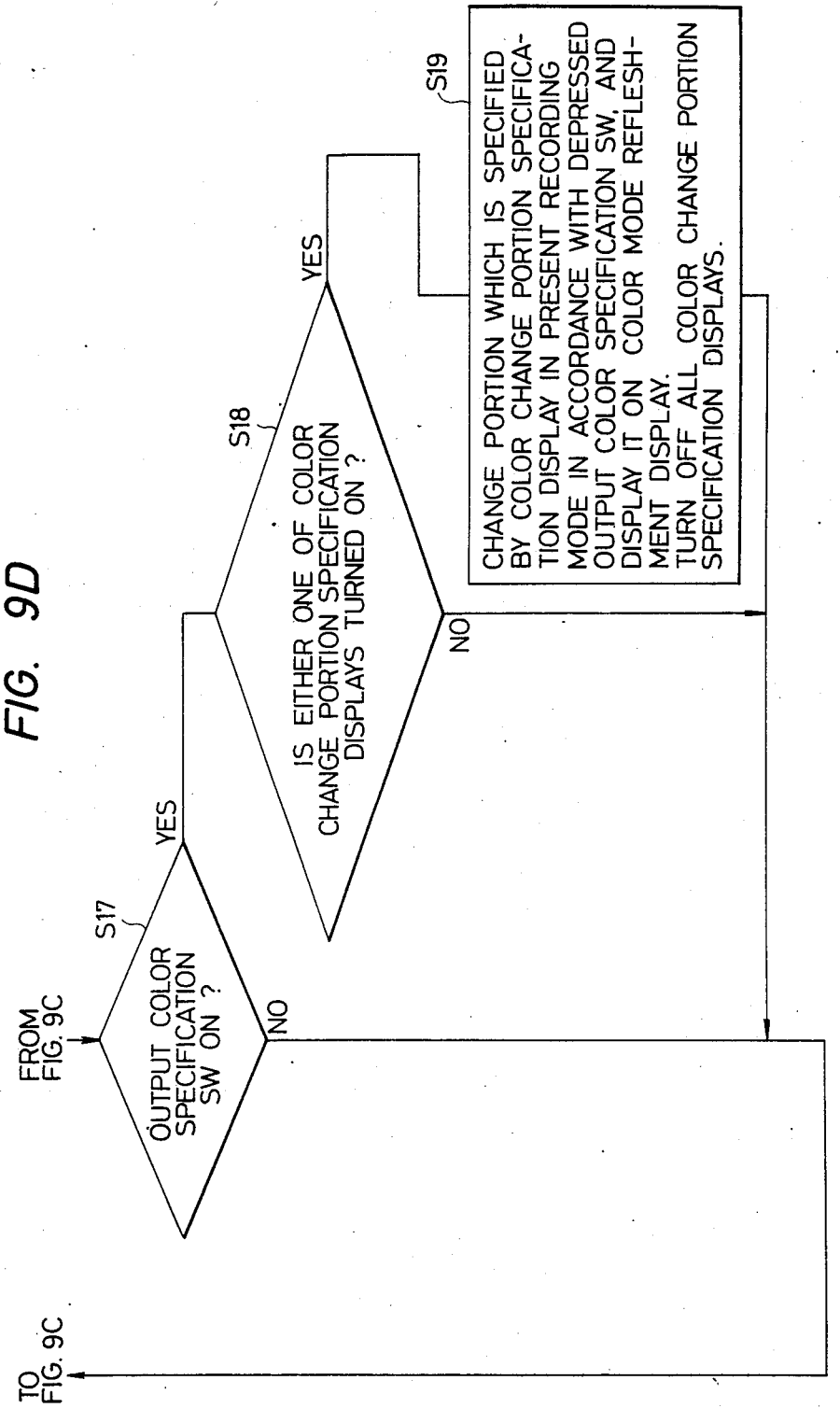

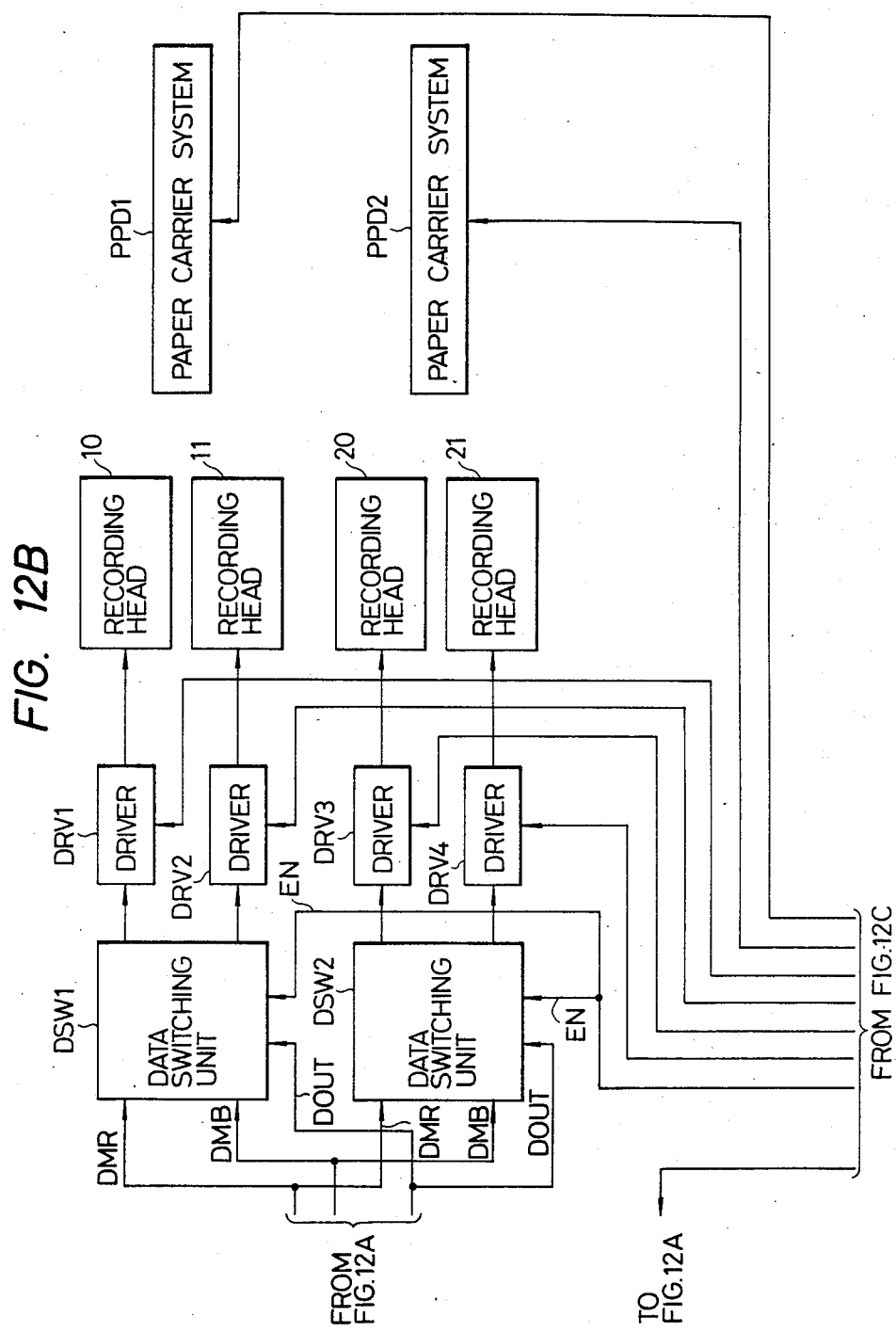

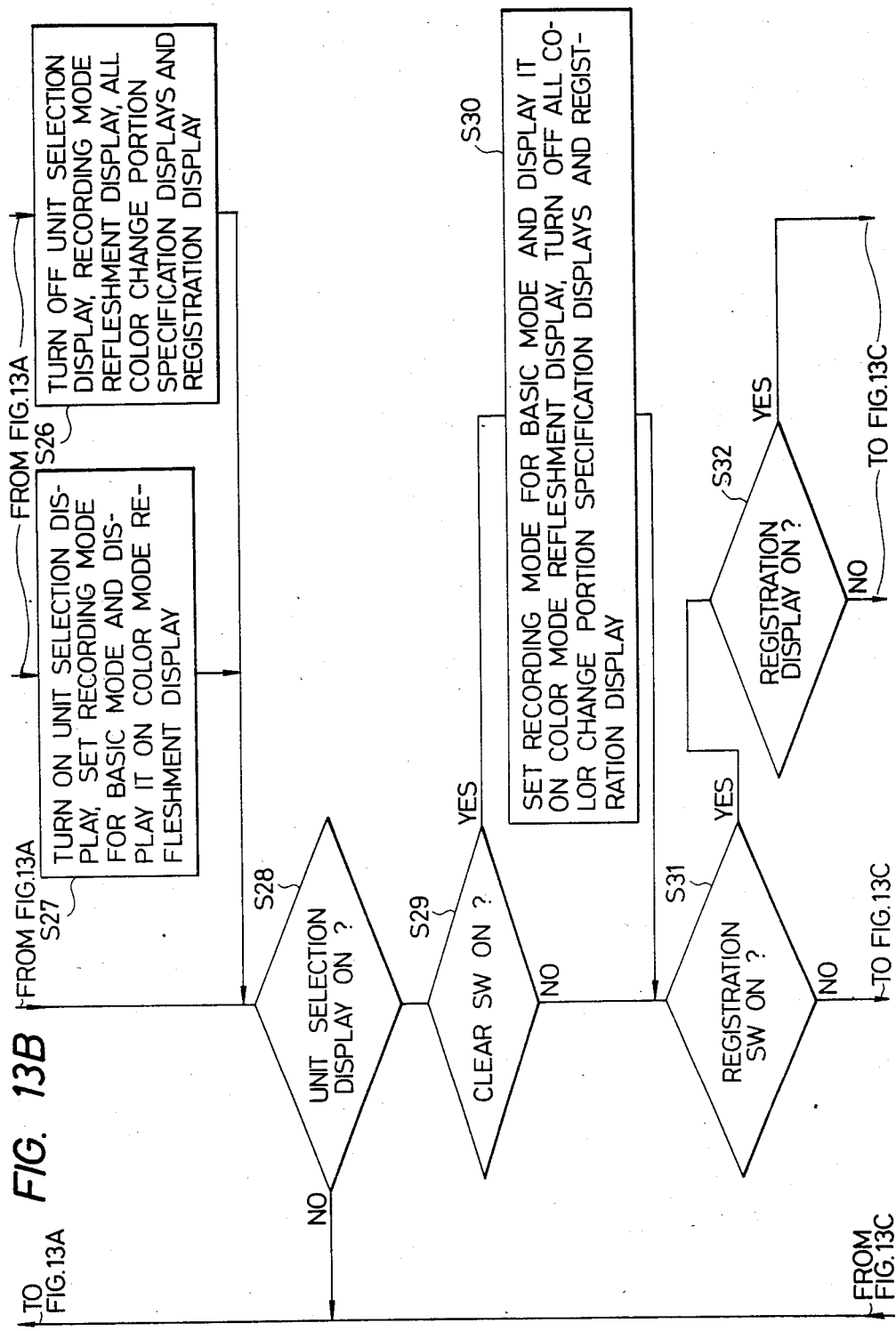

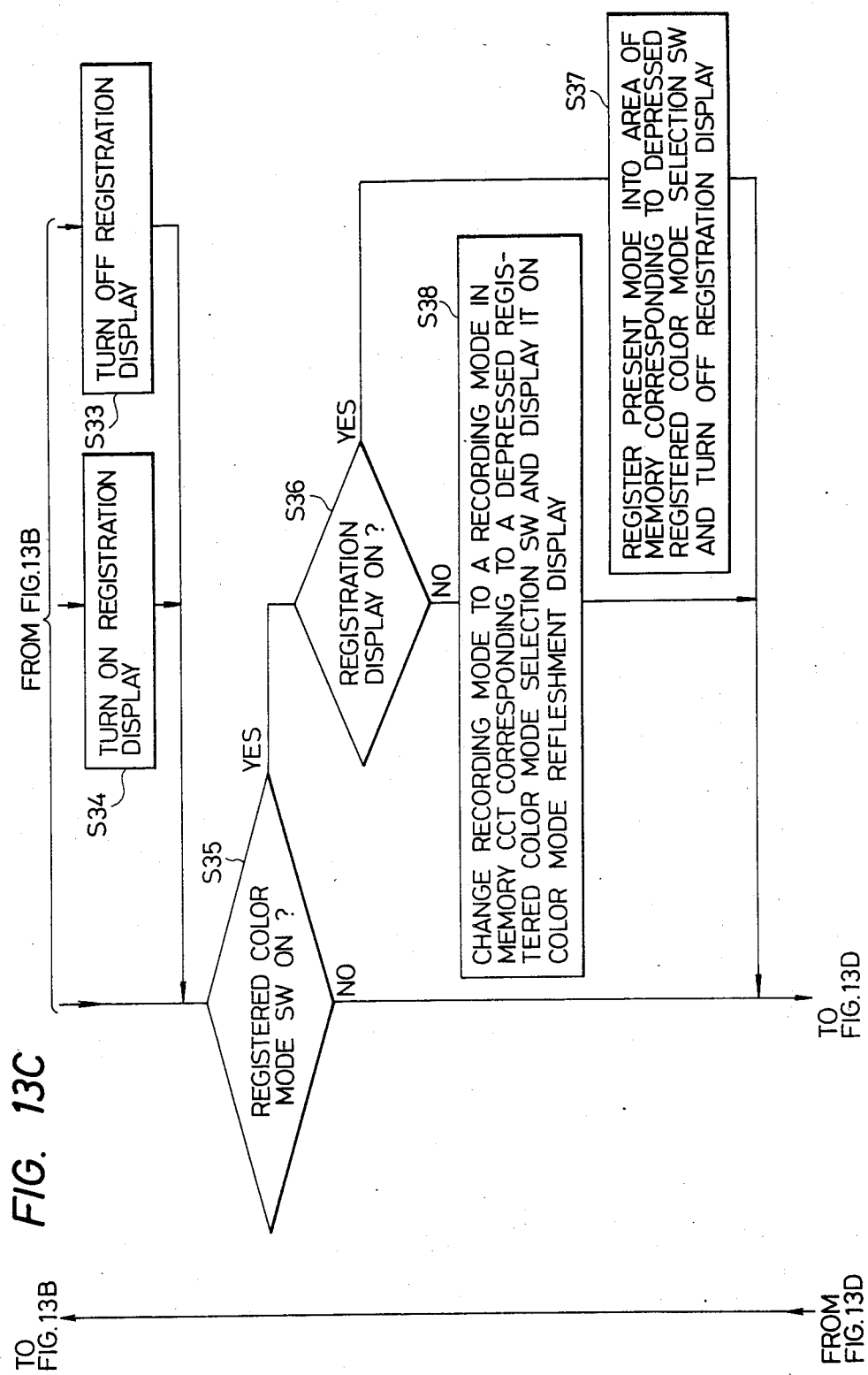

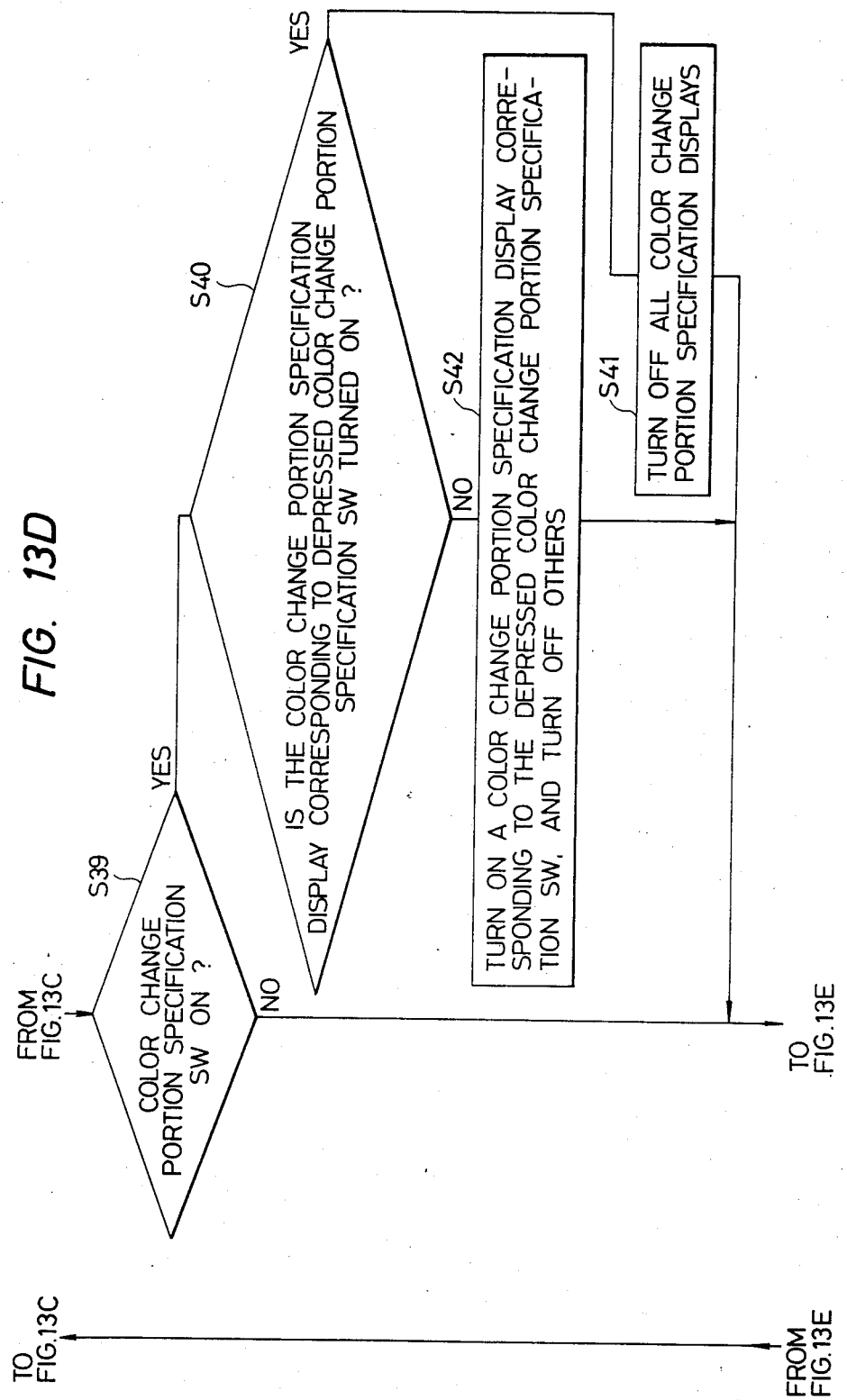

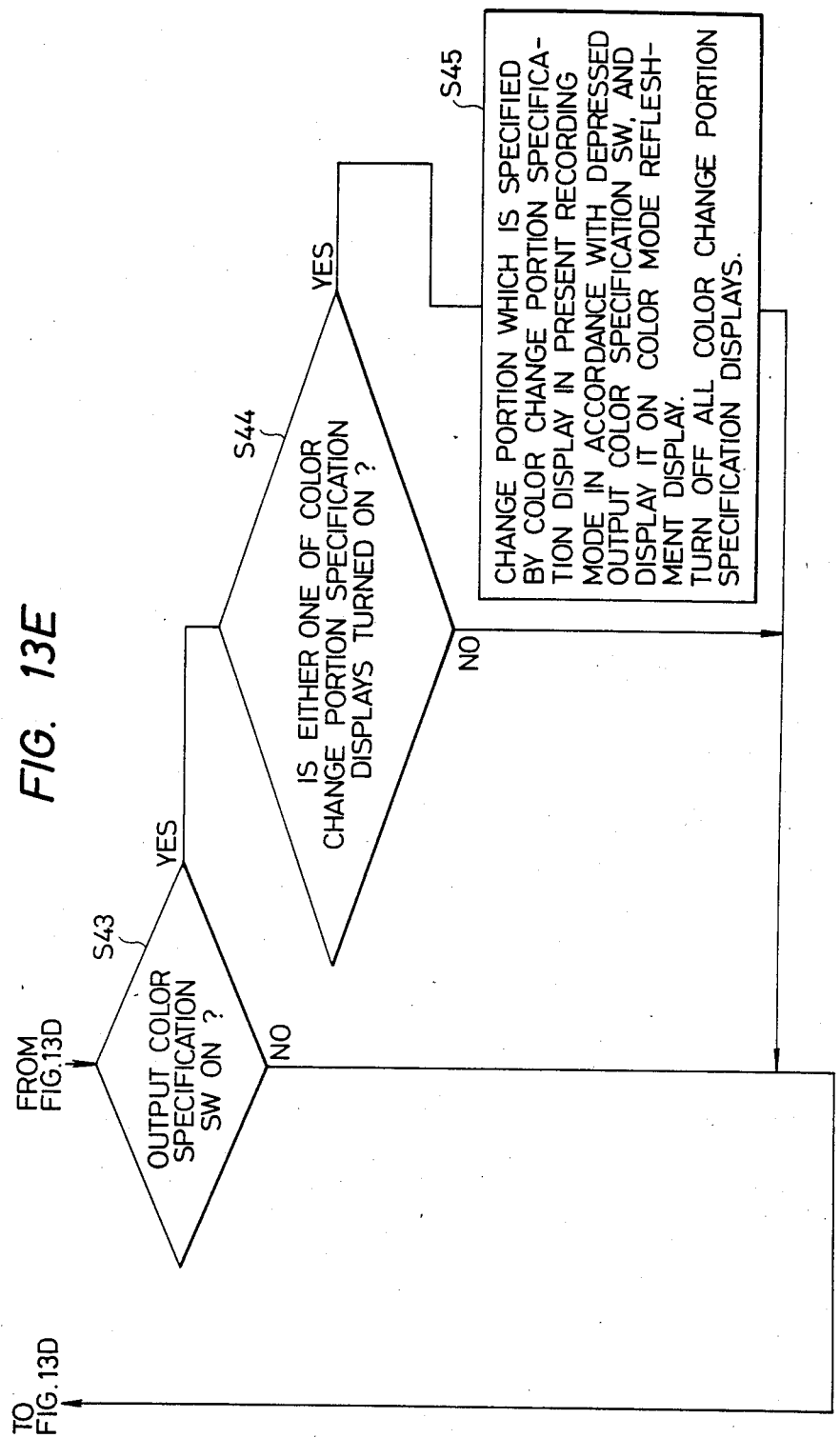

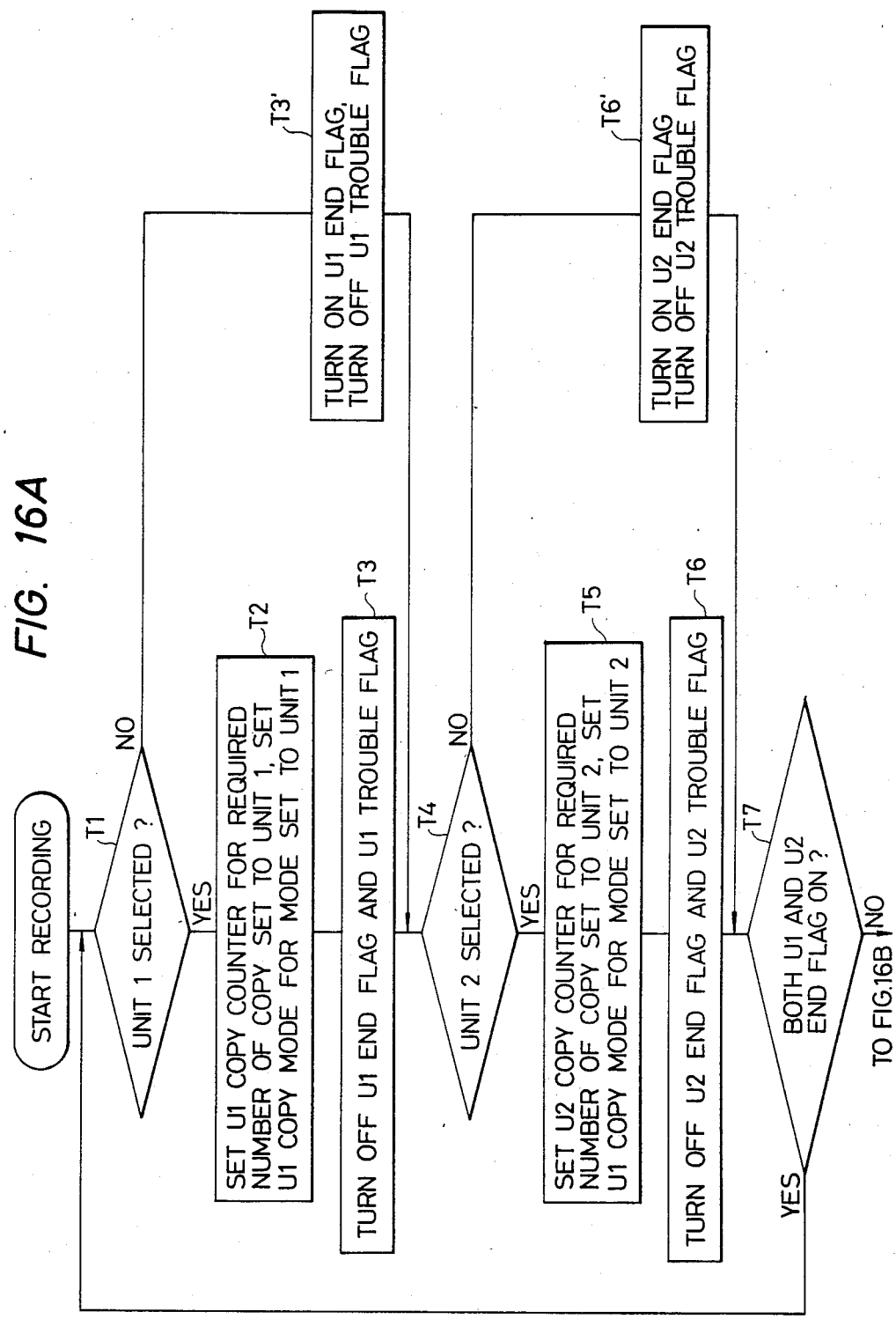

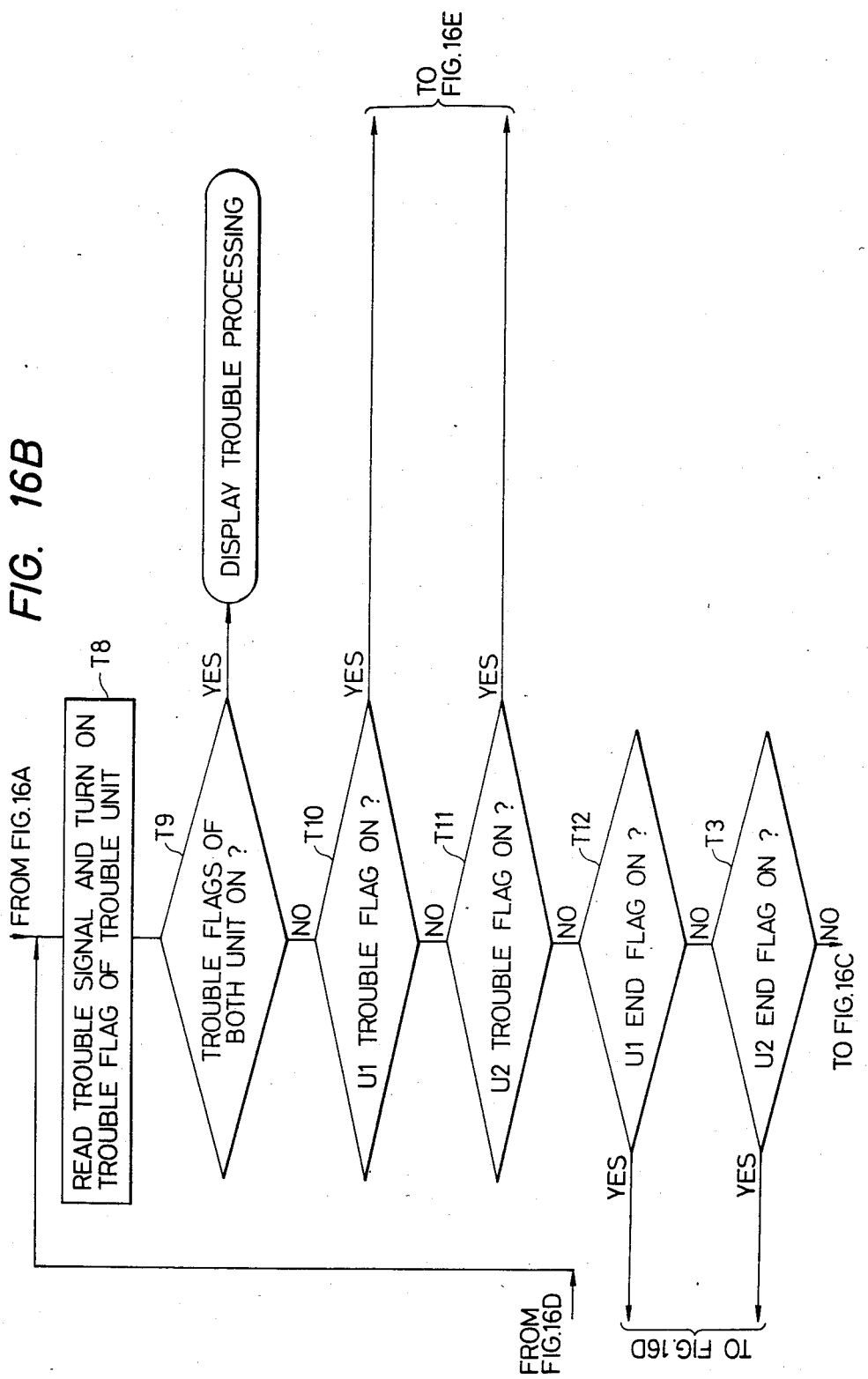

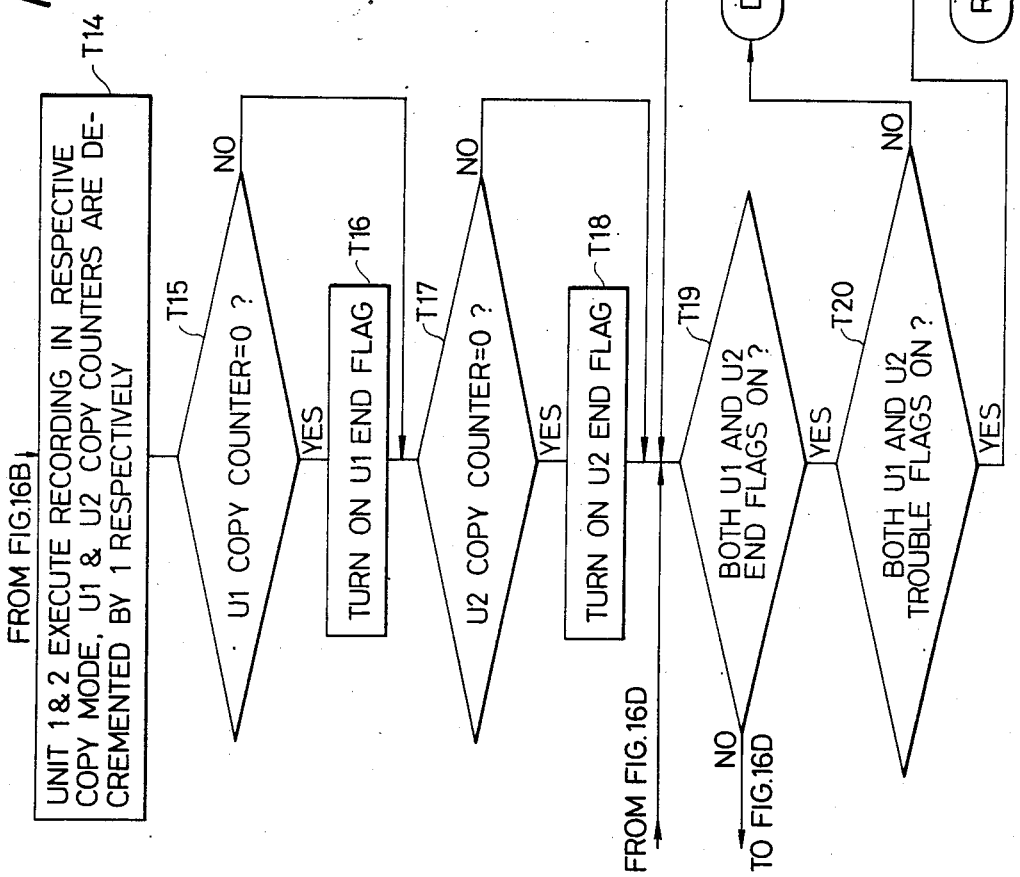

IMAGE RECORDING APPARATUS

This application is a continuation of application Ser. No. 433,969 filed Oct. 13, 1982, now abandoned.

BACKGROUND OF THE INVENTION

1. Field of the Invention

The present invention relates to an image recording apparatus for image recording on a recording material such as paper.

2. Description of the Prior Art

There are already known various image recording apparatus such as electrophotographic copiers. Such apparatus have generally been designed for image recording with black color, but there are recently proposed copiers, ink jet printers, thermal printers etc. for two-color recording in black and red or for full-color recording. There are also proposed recording apparatus capable of a recording mode for different image processing in specified areas.

Also the U.S. patent application Ser. No. 374,102, filed May 3, 1982, and commonly assigned with the present application, discloses a novel image recording apparatus in which areas are specified by blue loops on an original document in black and red colors, and the image recording corresponding to the inside or outside of said areas is made the same as in the original document or is inverted in colors.

Furthermore the U.S. patent application Ser. No. 370,464, filed Apr. 21, 1982, and assigned in common with the present application, discloses an image recording apparatus capable of a normal recording mode with a resolution of 8 dots/mm, a fine recording mode with a resolution of 16 dots/mm, and another recording mode with a modified image density.

Such recording apparatus with plural recording modes, though effective for office jobs, will merely be a waste of cost and space if its manipulation requires a trained operator.

Also in such recording apparatus the internal mechanisms are generally concealed by the outer casing so that the recording mode in execution can hardly be confirmed from the outside until the completed recording sheet is ejected from the discharge slot of the apparatus.

Furthermore the U.S. patent application Ser. No. 328,240, filed Dec. 7, 1981, and assigned in common with the present application, now U.S. Pat. No. 4,476,486, issued Oct. 9, 1984, proposes a recording apparatus provided with plural recording units for simultaneous image recording for the same information in order to reduce the time required for obtaining plural records from the same original document or same information. In such apparatus it is difficult to obtain recordings of a desired number in case one of the plural recording units develops a failure during the recording operation.

SUMMARY OF THE INVENTION

In consideration of the foregoing, the object of the present invention is to provide a recording apparatus permitting improved manipulation and exact operation.

Another object of the present invention is to provide a recording apparatus allowing easy selection of one of plural recording modes.

Still another object of the present invention is to provide a recording apparatus capable of displaying the recording mode selected from plural modes, thus allowing easy confirmation of the recording mode in execution.

Still another object of the present invention is to provide a recording apparatus with plural recording modes selectable according to a program determined by the operator.

Still another object of the present invention is to provide a recording apparatus with plural recording modes in which a determined recording mode is selected at determined states such as at the start of power supply.

Still another object of the present invention is to provide a recording apparatus with plural recording units capable of effective recording operation in case one of the recording units develops a failure.

Still other objects, features and advantages of the present invention will become fully apparent from the following description.

BRIEF DESCRIPTION OF THE DRAWINGS

FIG. 2 is a chart showing 81 recording modes achievable by said recording apparatus;

FIG. 8-1 composed of FIGS. 8-1A, 8-1B, and 8-1C is a block diagram showing an example of the control unit of said recording apparatus;

FIG. 8-2 is a block diagram showing an example of the area detecting circuit shown in FIG. 8-1;

FIG. 8-3 is a schematic view showing the mode of data processing in the circuit shown in FIG. 8-2;

DETAILED DESCRIPTION OF THE PREFERRED EMBODIMENTS

Now the present invention will be clarified in detail by the following description to be taken in conjunction with the attached drawings.

Figure 1:
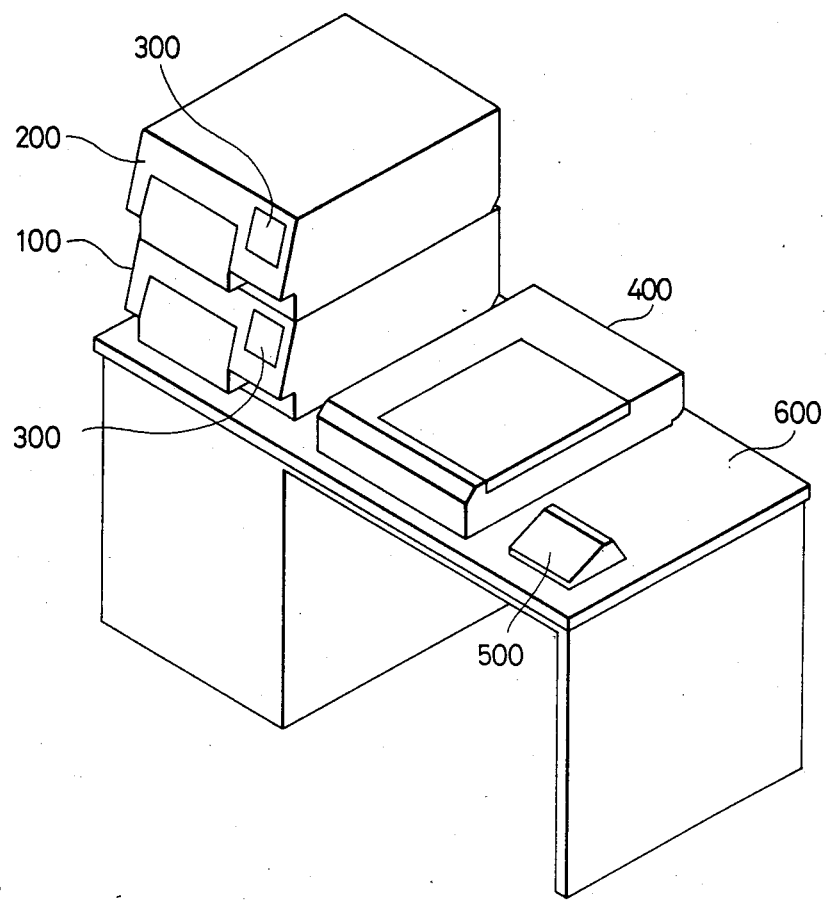
FIG. 1 is a perspective view of a recording apparatus embodying the present invention.

FIG. 1 showing a recording apparatus embodying the present invention, wherein provided are recording units 100, 200 respectively provided with a black recording head and a red recording head; a console panel 300 provided with recording unit selecting switches, mode selecting switches and mode indicators to be explained later; an image reading unit 400 for reading the image on an original document; an input console 500 provided with numeral keys for entering the number of copies to be made, a clear key, a copy number indicator, a copy start key, a stop key etc.; and a table 600 on which the aforementioned components are installed.

In addition to the reproduction of the read image without modification, the present embodiment is capable, by specifying an area with a blue frame on an original document in black and/or red, of effecting different processings on black and red images respectively inside and outside said blue frame, for example erasing or reproducing in black the red image alone inside the blue frame, or reproducing in red or erasing the black image outside said frame.

Figure 3:
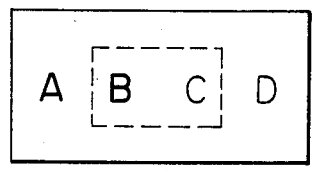
FIG. 3 is a schematic view showing an example of the original document.
Figures 1A, 8:
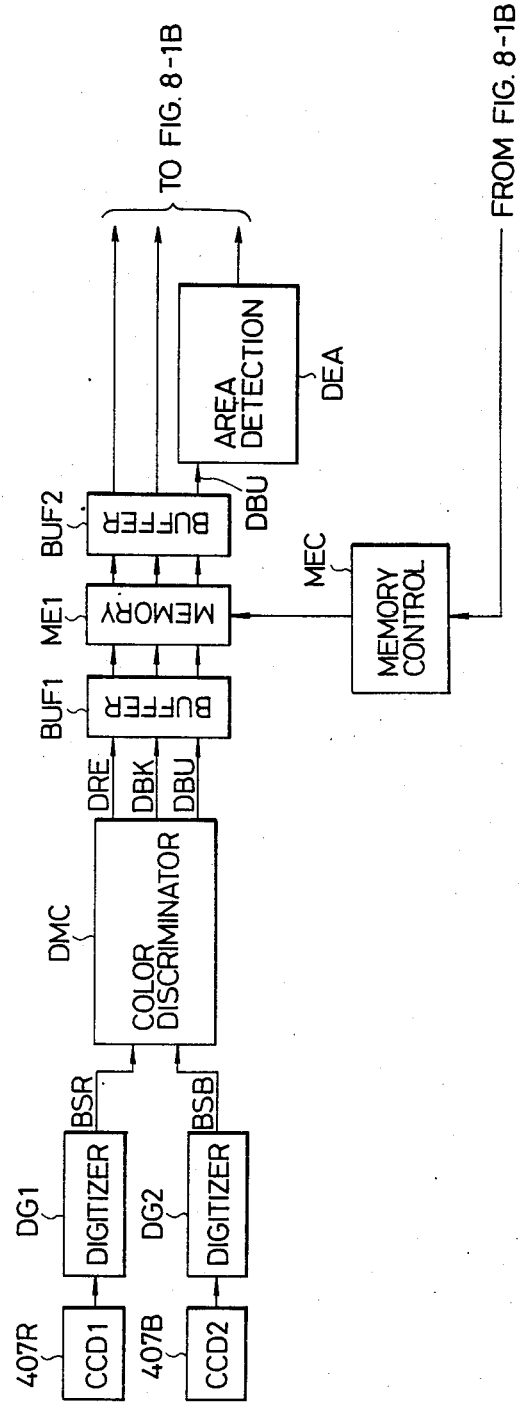
Figures 1C, 8:
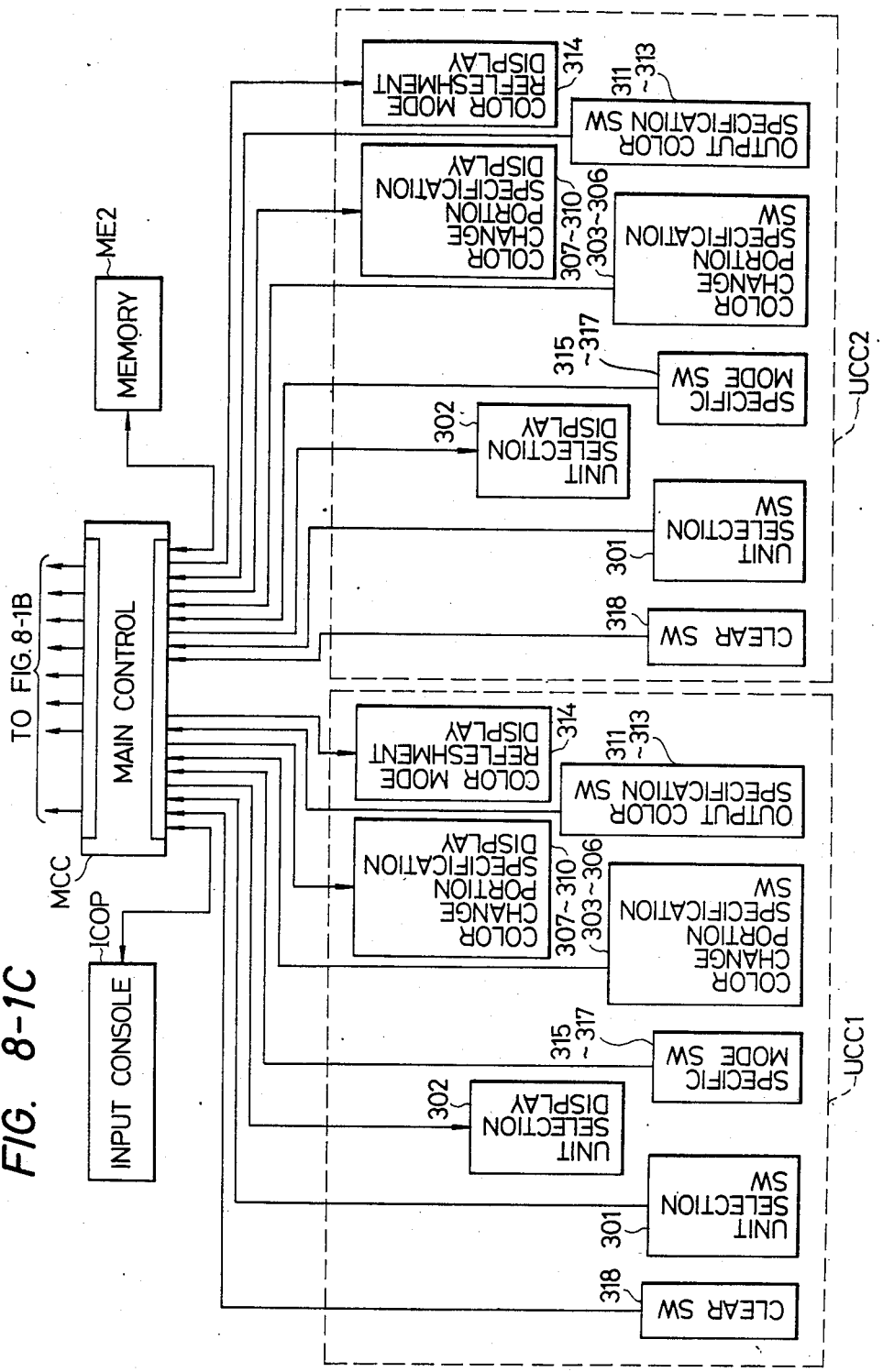
Figures 2, 8:
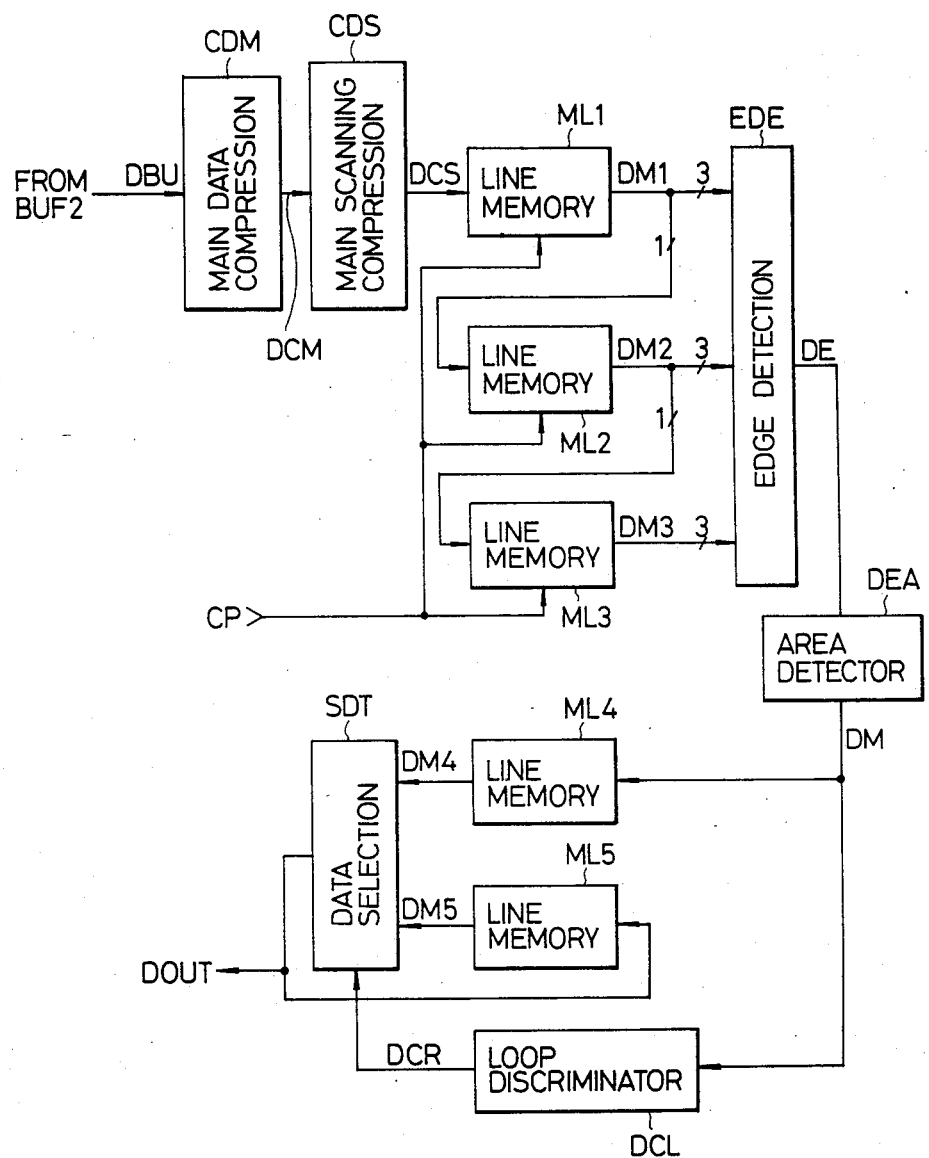
Figures 3, 8:
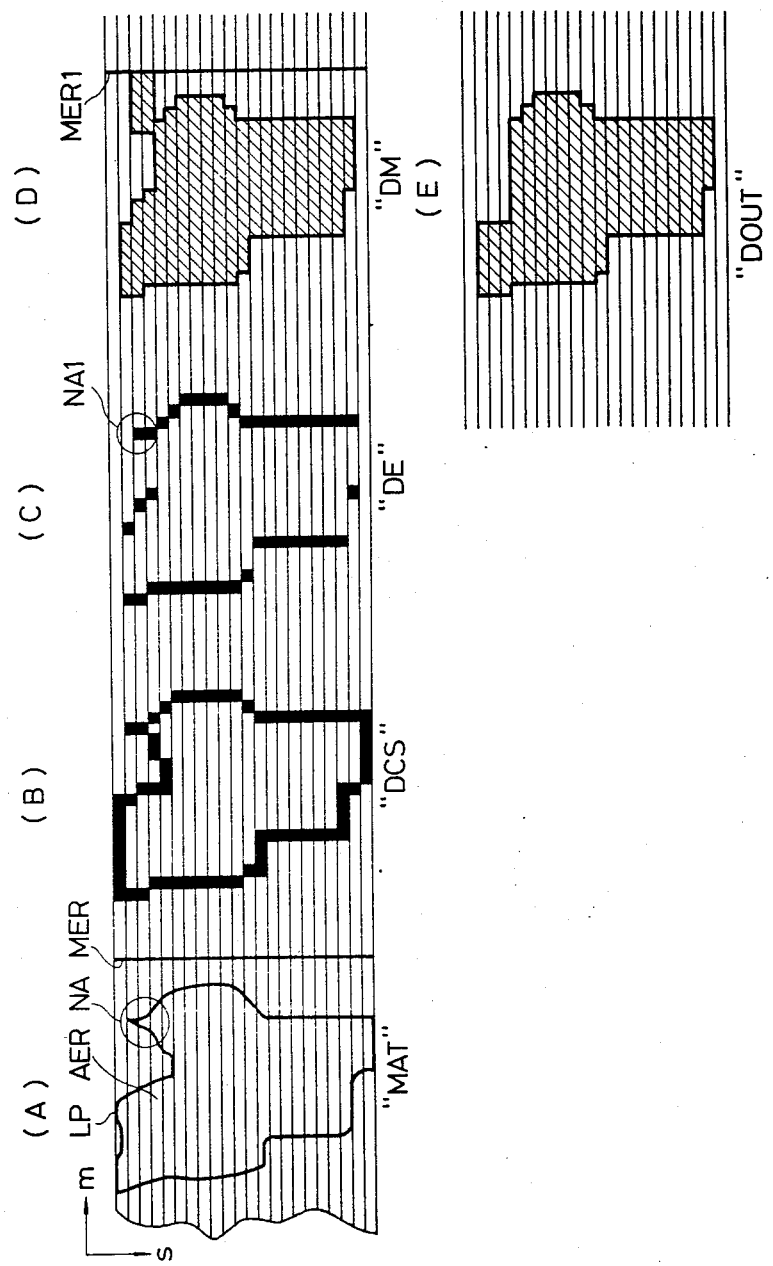

FIG. 2 shows 81 recording modes achievable by the present recording apparatus. FIG. 3 shows an example of the original document to be reproduced, in which A and B in thick lines represent black images while C and D in thin lines represent red images, and broken line indicates a blue frame for specifying an area. Also in FIG. 2, thick-lined letters and thin-lined letters respectively indicate black and red recordings, and blank indicates erasure of the image.

In FIG. 2, the first horizontal column COL1 shows the recording modes of all the areas of the original document when the aforementioned frame is not specified, and the second vertical column COL2 shows the recording modes for the area specified by said frame. In said column, "black-(blank)" or "red-(blank)" respectively indicates erasure of black or red image. Also the third horizontal column COL3 shows 9 recording modes without the specified area, but such cases without specified area will not be separately discussed since said 9 recording modes are included in 81 recording modes shown at the crossing points of the columns COL1 and COL2.

As an example, in case a character A in black (hereinafter simply represented as black A) outside the frame, red D outside the frame, black B inside the frame and red C inside the frame are to be recorded without change in color, a recording mode without change in color both inside and outside the frame, as represented at a crossing point CRS1 in FIG. 2, may be selected to effect recording of a black character outside the frame in black (hereinafter simply represented as black-to-black recording), red-to-red recording outside the frame, black-to-black recording inside the frame and red-to-red recording inside the frame. The selection of each mode can be achieved as will be explained later.

Figure 4:
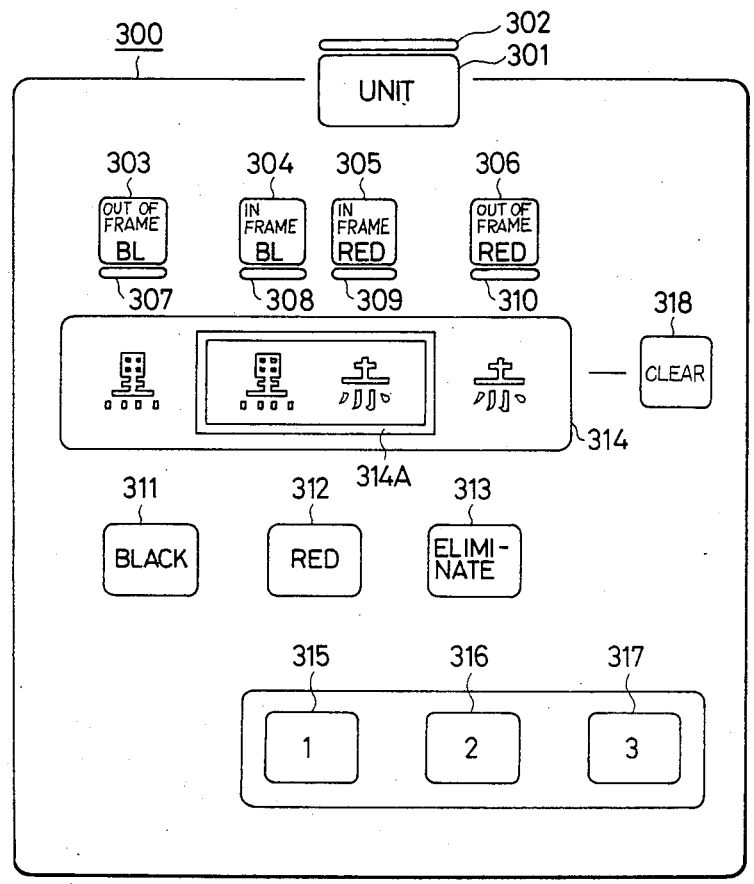
FIG. 4 is a plan view of the console panel and switches thereon of the apparatus shown in FIG. 1.

FIG. 4 shows an example of a console panel 300 of the recording unit 100 shown in FIG. 1. Said console panel is provided with a switch 301 for selecting the recording unit; a recorder selection indicator 302 to be lighted when this recording unit 100 is selected by the actuation of said switch 301; color change area selecting switches 303–306 of which one can be selectively actuated; corresponding indicators 307–310 to be lighted corresponding to the actuated switch; output color selecting switches 311–313 for recording the image in an area selected by the switches 303–306 in black or red or erasing said image; and a color mode indicator 314 for displaying a mode pattern representing the recording mode selected by the switches 303–306 and 311–313.

The words "black" and "red" represent the colors of the image on the original document, and a frame 314A indicates the specified area. In the present embodiment it is possible to specify an area with a determined color, for example blue color, on the original document and to select a determined processing for the image of each color respectively inside or outside said frame or area. The color mode indicator 314 displays the mode pattern thus selected, thus enabling the visual confirmation of the recording mode by the operator.

Specific mode selecting switches 315, 316, 317 are allotted to most frequent recording modes selected by the manufacturer, and effect said recording modes by simply actuating said switches, without selecting the image processing inside or outside the frame. A clear key 318 cancels the selected mode and selects a basic recording mode, whereby a pattern corresponding thereto is displayed on the color mode indicator 314. In the basic recording mode the images on the original document are recorded without particular processing such as change or conversion in color. The apparatus may also be so constructed as to return to said basic recording mode at certain states, for example at the end of an operation.

Now there will be given an explanation, with reference to FIG. 4, on the procedure of selecting, as an example, the basic recording mode in which black image is recorded in black and red image is recorded in red, both inside and outside the frame.

At first the color change area selecting switch 303 and the output color selecting switch 311 are actuated to record the black image outside the frame in black. Then the switches 304 and 311 are actuated in succession to record the black image inside the frame in black. Then the switches 305 and 312 are actuated in succession to record the red image inside the frame in red. Finally the switches 306 and 312 are actuated in succession to record the red image outside the frame in red.

Similarly 81 recording modes shown in FIG. 2 can be selected by selecting the areas with the switches 303–306 and specifying a recording color or the erasure of image for each area by the switches 311–313.

Figure 5:
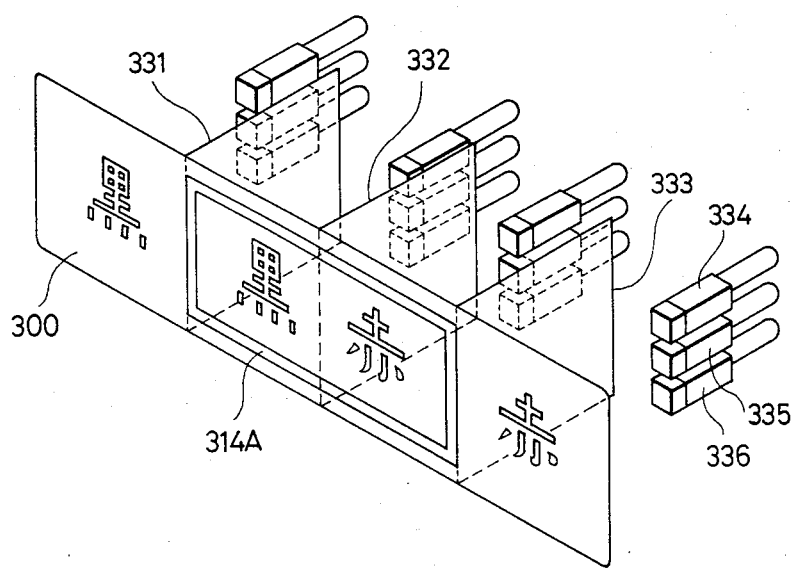
FIG. 5 is a perpsective view showing a mode indicator of said apparatus.

FIG. 5 shows an embodiment of the color mode indicator 314 shown in FIG. 4, wherein an opaque display panel 330 is provided with punched patterns as illustrated, and the central words "black" and "red" are surrounded by a blue frame 314A. Behind said panel 330 words are separated by opaque partitions 331–333, and behind each word provided are a blue lamp 334, a red lamp 335 and a white lamp 336, which are selectively lighted to display the desired mode pattern. The blue lamp indicates recording in black, the red lamp indicates recording in red, and the white lamp indicates that the image is erased.

Naturally the color mode indicator 314 may be replaced by other display devices, for example utilizing a cathode ray tube.

Figure 6:
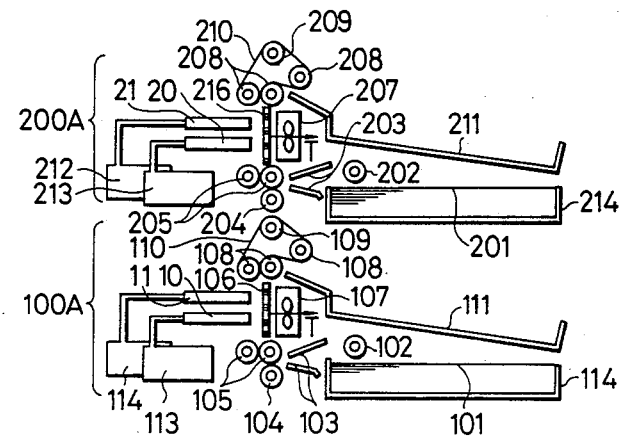
FIG. 6 is a detailed view of the recording units of the apparatus shown in FIG. 1.

FIG. 6 shows the details of the recording units 100, 200 in FIG. 1, wherein said recording units are respectively provided with two recording heads, for example ink jet heads, 10, 11 and 20, 21. Each ink jet head, constructed as a full-line recording head having a linear array of plural recording elements arranged at least over the width of the recording sheet and in a direction perpendicular to the plane of FIG. 6, is activated for recording in response to electric signals from an unrepresented information source. In the present embodiment it is assumed that the ink jet heads 10 and 20 are used for black recording while the heads 11 and 21 are used for red recording. Said recording units are vertically superposed by means of unrepresented support members. Said recording units are mutually different in the head structure or in the control thereof but may be constructed in the same manner in other mechanisms. Furthermore said recording units need not necessarily be superposed but may be arranged in a different positional relationship.

There are also shown recording sheets 101, 201 stored in sheet cassettes 114, 214; feed rollers 102, 202; guide plates 103, 203; registering rollers 104, 204; first transport rollers 105, 205; platens 106, 206 provided with plural slits; fans 107, 207; second transport rollers 108, 208; suspension rollers 109, 209; conveyor belts 110, 210; sheet trays 111, 211; and ink tanks 112, 113, 212, 213.

The recording operation in the above-described recording units will be explained in the following description, which will be concentrated on the recording unit 100, since the units 100, 200 function in the identical manner except the function of the ink jet heads.

The recording sheet 101 stored in the cassette 114 is advanced by the feed roller 102 along the guide plate 103 to the initially stopped registering roller 104, thereby forming a loop in front of the registering roller. Subsequently the recording sheet is further advanced by the rotation of the registering roller 104, and is transported between the registering roller and the first transport roller 105 toward the ink jet heads 10, 11. Opposite to the ink jet heads 10, 11 positioned are the platen 106 with slits and the fan 107 blowing air in a direction T, so that the recording sheet supplied from the first transport roller 105 is advanced toward the second transport roller 108 along the platen 106, while being sucked by the fan 107. Then image recording is performed by the ink jet head 10 and/or 11 in response to electric signals from an unrepresented information source. After the image recording, the leading end of the recording sheet is guided by the second transport roller 108 and the conveyor belt 110 for ejection onto the sheet tray 111.

Figure 7:
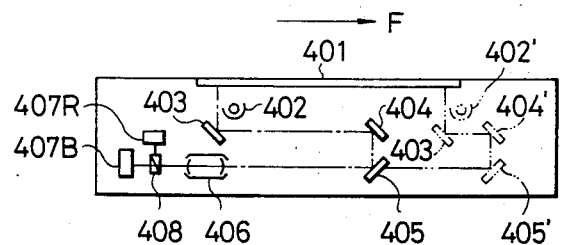
FIG. 7 is a detailed view of the image reading unit of the apparatus shown in FIG. 1.

FIG. 7 schematically shows the original reading unit shown in FIG. 1, wherein provided are an original carriage glass 401; a rod-shaped light source 402 such as a halogen lamp or a fluorescent lamp; a first mirror 403; a second mirror 404; a third mirror 405; and an imaging lens 406. A color separating beam splitter 408, positioned corresponding to the lens 406, is designed to reflect the light components of long wavelength region including red light and to transport the light components of short wavelength region including blue light. Photoelectric converting elements 407R, 407B, for respectively receiving the reflected light and the transmitted light from the beam splitter 408, may be composed of a one-dimensional solid-state image sensor such as a charge-coupled device, are so positioned as to read a same area of the original document, wherein the main scanning direction is perpendicular to the plane of FIG. 7.

In the above-described original reading unit, an original document placed on the carriage glass 401 is illuminated by the light source 402, and the image of the original document is formed on the charge-coupled devices 407B, 407R through the first, second and third mirrors 403, 404, 405 performing subsidiary scanning on the original document. The rod-shaped light source 402 is constructed integral with the first mirror 403 by an unrepresented support member and moves in a direction F along unrepresented guide rails for performing the subsidiary scanning of the original document. The second and third mirrors 404, 405 are constructed integral by an unrepresented support member and are displaced along unrepresented guide rails in a same direction as that of the first mirror 403 and with a speed equal to a half of that of the mirror 403. The light source 402, first, second and third mirrors 403, 404, 405 move to. the broken-lined positions 402', 403', 404', 405' always maintaining a constant optical path length from the carriage 401 to the lens 406 through the mirrors 403, 404, 405. Consequently time-sequential signals corresponding to the raster scanning of the original document can be obtained by sequential signal reading from the elements of the charge-coupled devices 407B, 407R during the subsidiary scanning.

FIG. 8-1 shows an example of the control unit for use in the present embodiment, wherein the same components as those in FIGS. 1 to 7 are represented by same numbers. A main control circuit MCC composed of a known microcomputer controls the function of the apparatus and the data input, display etc. of the console through input/output ports. The output signals from the photoelectric converting element 407R receiving the light of long wavelength range, including red light, and from the photoelectric converting element 407B receiving the light of short wavelength range, including blue light, are respectively supplied to digitizers DG1, DG2 for conversion into digital signals BSR, BSB, which are then supplied to a color discriminating circuit DMC to obtain a red data signal DRE, a blue data signal DBU and a black data signal DBK. These signals are stored in a memory ME1 through a buffer BUF1.

The color discrimination in said color discriminating circuit DMC is achieved in the following manner. The converting element 407B for detecting the light of short wavelength range including blue light is responsive to a black area not including the image information and to a blue image but is insensitive to black and red images. On the other hand, the converting element 407R for detecting the light of long wavelength range including red light is responsive to a blank area and to a red image but is insensitive to black and blue images. Consequently an image area is identified as a blank area if it is detected by both elements 407B, 407R; as a black image if detected neither by 407B nor by 407R; as a red image if detected by 407R but not by 407B; and as a blue image if detected by 407B but not by 407R, as summarized in Tab. 1:

TABLE 1

|  | Black image | Red image | Blank area | Blue image |
| --- | --- | --- | --- | --- |
| photoelectric converter for short wavelength range (PHB) | no detection | no detection | detection | detection |
| Photoelectric converter for long wavelength | no detection | detection | detection | no detection |

TABLE 1-continued

| | Black image | Red image | Blank area | Blue image |
|---|---|---|---|---|
| range (PHR) | | | | |

A memory control circuit MEC, controlled by the main control circuit MCC, supplies the memory ME1 with address signals, timing signals and read/write signals for controlling the write-in or read-out of the red, blue and black data signals DRE, DBU, DBK into or from the memory ME1.

The red and black data signals DRE, DBK stored in the memory ME1 are read at determined timings and are respectively supplied to data switching circuits DSW1, DSW2 through a buffer circuit BUF2. On the other hand the blue data signal DBU is also read at a determined timing and supplied through the buffer circuit BUF2 to an area detecting circuit DEA for detecting the blue framed area on the original document, and a data switching control signal DOUT obtained by said detection is supplied to the data switching circuits DSW1, DSW2.

FIG. 8-2 shows the structure of the area detecting circuit DEA, wherein the blue data signal DBU is at first subjected to noise reduction in order to enable area detection even in the presence of a noise. For this purpose the blue data signal DBU is subjected to data compression by a main scanning data compressor CDM and then by a subsidiary scanning data compressor CDS to obtain compressed data signals DCS, which are in succession stored in a first line memory ML1 in response to clock pulses CP2. The data thus stored in the line memory ML1 are read in response to determined clock pulses CP and the resulting 3-bit data DM1 are supplied to an edge detector EDE while a bit thereof is also supplied to a second line memory ML2. The second line memory ML2 also sequentially stores the data DM1 in response to the clock pulses CP2 and is sequentially read. The resulting 3-bit data DM2 are supplied to the edge detector EDE, and a bit thereof is supplied to a third line memory ML3. The third line memory ML3 stores the data DM2, and 3-bit data DM3 read therefrom are again supplied to the edge detector EDE.

The edges of an area specified by the blue frame on the original document are detected by the edge detector EDE according to three data DM1, DM2 and DM3 mutually delayed in time. Edge data signals DE thus obtained are supplied to the area detecting circuit DEA to obtain area data signals DM, which are supplied to a loop (frame) discriminator DCL and a fourth line memory ML4. The fourth line memory ML4 stores the area data signals DM in succession, and the stored signals are supplied as readout data DM4 to a data selector SDT. Also the loop discriminator DCL supplies a data selection control signal DCR to the data selector SDT for selecting either the readout data DM4 from the fourth line memory ML4 or the readout data DM5 from a fifth line memory ML5 as the output signal DOUT. As explained in the foregoing, the output signal DOUT is supplied to the data switching circuits DSW1, DSW2. At the same time the output signal is stored in the fifth line memory ML5 during the signal reading period of a succeeding line.

FIG. 8-3 graphically shows the data at various stages of the data processing in the circuit shown in FIG. 8-2. As shown by (A), the area AER to be read is specified by a blue loop or frame LP on the original document of A4 size. MER indicates the right-hand end of the document. Said loop LP is optically read on the original document with the main scanning direction m and the subsidiary scanning direction s. (B) shows the compressed data signal DCS obtained by subjecting the blue data signal DBU to the main scanning data compression and the subsidiary scanning data compression. Said compressed data signal DCS is used in the edge detector EDE for obtaining the edge information DE as shown in (C).

The area detector DEA is composed of a D-type flip-flop which is set by the edge information DE at the front edge or left-hand edge in a scanning line and is reset by the edge information DE at the rear edge or right-hand edge in the line. Consequently the set state Tzk of said flip-flop to be set and reset by the paired edge information at the front and rear edges represents the specified area AER on the scanning line.

Also there may appear plural pairs of edge information DE on a line. The area data DM obtained by such area detector DEA is shown in (D), wherein the hatched area indicates the set state Tzk thereof. In the subfigure (A) there is shown a very narrow part NA in the specified area AER. The edge information De corresponding to the narrow part NA consists only of the front edge information NA1 but does not include the rear edge information, as shown by (C). Consequently the flip-flop of the area detector DEA is set by said front edge information NA1 and remains in this state to the right-hand end MER1. In this manner an area outside the specified area AER may be mistaken by the area detector DEA as inside the specified area AER.

In order to avoid such error, the present invention utilizes the edge information DE detected in the preceding line in case the right-hand end MER1 is detected while the area detector DEA emits a signal representing inside the specified area. For this purpose the edge information DE in the presently read line is stored in the fourth line memory ML4 while the edge information DE of the preceding line is stored in the fifth line memory ML5, and the data selector SDT selects the edge information stored in said fifth line memory ML5 if the right-hand end MER1 is detected inside the "specified area". The control output signal DOUT obtained by such processing and the corresponding specified area are shown in subfigure (E). In this manner obtained is the information resembling the shape of the specified area AER surrounded by the loop LP shown in (A).

However, direct drawing of the loop LP on the original document for defining the specified area may be inconvenient in case the document should not be smeared. In such case the loop LP may be drawn, for example with a rapid-drying marker, on a transparent film or plate on the original document and may be easily erased afterwards.

In FIG. 8-1, input control circuits UCC1, UCC2, for the recording units 100, 200 includes the switches 301 etc. and the color mode indicator 314 explained in relation to FIG. 4. The switches are connected to the main control circuit MCC which executes the programs stored in the memory ME2 in response to the actuation of said switches, as will be explained later in relation to FIG. 9. Paper drive systems PPD1, PPD2 drive rollers and other mechanisms in the recording units 100, 200 under the control of the main control circuit MCC. ICOP indicates the console panel of the input unit.

Figure 9B:
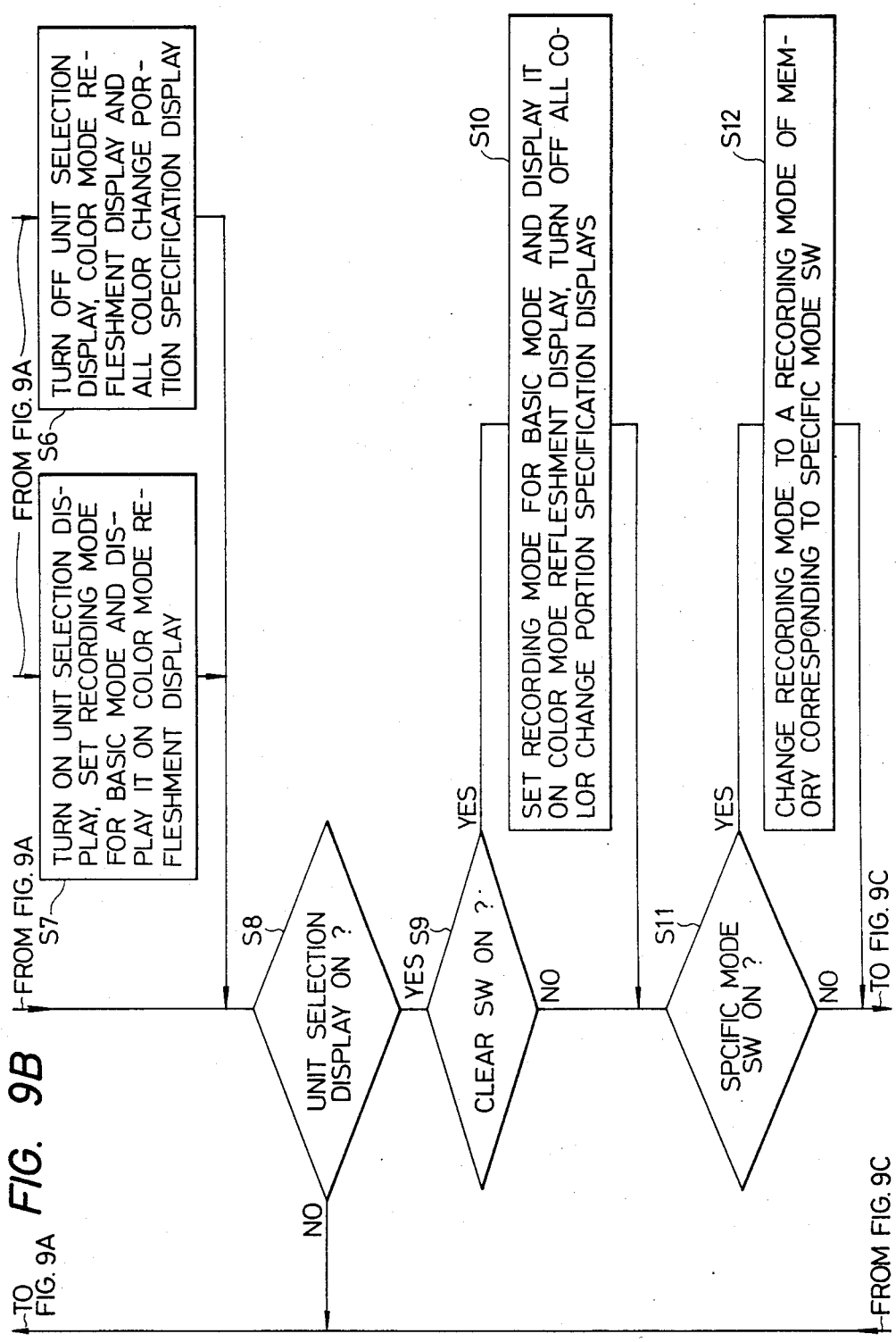
FIG. 9 composed of FIGS. 9A, 9B, 9C and 9D is a flow chart showing the procedure of selecting the recording mode in the recording apparatus shown in FIG. 1.

FIG. 9 shows the unit console input processing procedure in the recording units 100, 200, wherein the step S1 identifies if the apparatus is powered and reset, and, if so, the step S2 sets the recording mode to the aforementioned basic mode and displays said basic mode on the color mode indicator 314. Subsequently the step S3 lights the selection indicator 302 for the recording units (abbreviated as "unit" in FIGS. 8 and 9) and turns off all the color change area indicators 307-310.

The step S4 identifies if the unit selection switch 301 is actuated, and, if affirmative, the program proceeds to the step S5 for identifying whether the unit selection indicator 302 is lighted in response to the actuation of unit selection switch 301. If it lighted, the step S6 turns off the unit selection indicator 302, color indicator 314 and color change area indicators 307-310 and the program proceeds to the step S8. If the identification in the step S5 is negative, the step S7 is executed to light the unit selection indicator 302, to set the recording mode to basic mode and to display the basic mode on the color mode indicator 314, and the program proceeds to the step S8.

Also in case the identification in the step S4 is negative, the step S8 is executed to identify whether the unit selection indicator 302 is lighted, and if negative, the program returns to the step S4. In case the identification is affirmative, the step S9 in executed to identify whether the clear switch 318 is actuated, and if affirmative, the step S10 is executed to set the recording mode to the basic mode, to display the basic mode on the color mode indicator 314 and to turn off the color change area indicator 307-310 and the program proceeds to the step S11.

The step S11 identifies if any of the specific mode switches 315-317 is actuated, and, if affirmative, the step S12 is executed to recall the recording mode stored in a determined area of the memory ME2 corresponding to the actuated one of the specific mode switches 315-317 and to display thus recalled mode on the mode indicator 314, and the program proceeds to the step S13.

In case of negative identification in the step S11, the program proceeds to the step S13 to identify the actuation of the color change area selecting switches 303-306. In case the identification is affirmative, the step S14 is executed to identify if any of the color change area indicators 307-310 corresponding to the actuated color change area selecting switch is lighted. If affirmative, the step S15 is executed to turn off all the color change area indicators 307-310 and the program proceeds to the step S17. Also in case the identification in the step S14 is negative, the step S16 is executed to light one of the color change area indicators 307-310 corresponding to the actuated one of the color change area selecting switches 303-306 while turning off other indicators, and the program proceeds to the step S17.

In case the identification in the step S13 is negative, the step S17 is executed to identify if any of the recording color selecting switches 311-313 is actuated, and, if affirmative, the step S18 is executed to identify if any of the color change area indicators 307-310 is lighted. If the result is affirmative, the program proceeds to the step S19 to change the recording color in the areas indicated by the color change area indicators 307-310 according to the actuated recording color selecting switches, to display the changed recording mode on the color mode indicator 314 and to turn off all the color change area indicators 307-310, whereupon the program returns to the step S4.

Figure 10:
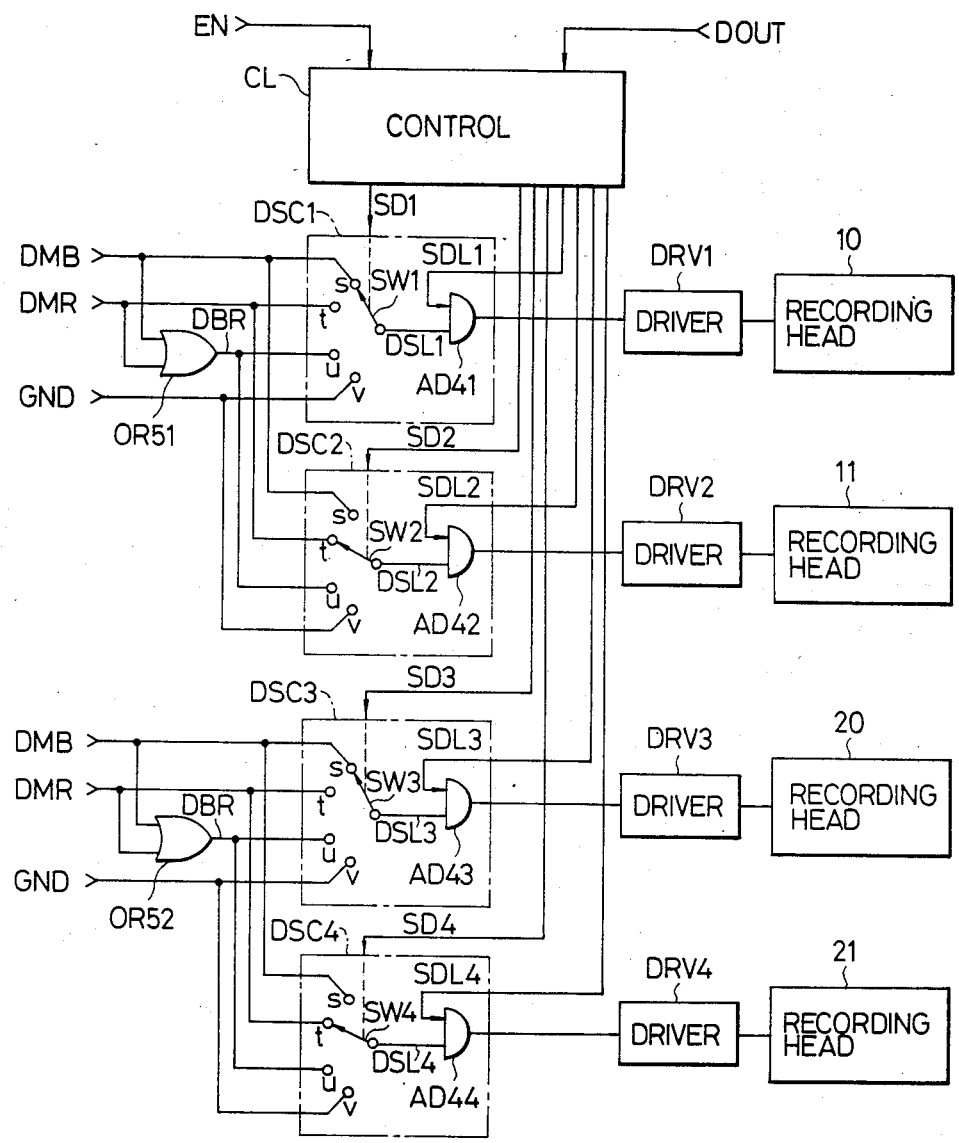
FIG. 10 is a block diagram showing the details of the data switching unit shown in FIG. 8-1.

FIG. 10 shows an example of the data switching circuits DSW1, DSW2 shown in FIG. 8, wherein a mode control circuit CL receives the mode selecting signal EN from the input control circuits, UCC1, UCC2 and the data switching control signal DOUT, and generates a first data selecting signal SD1, a second data selecting signal SD2, a third data selecting signal SD3, a fourth data selecting signal SD4 and first to fourth logic signals SDL1-SDL4 for controlling the passing of the selected data. The black readout data signal DMB, the red readout data signal DMR, a logic sum signal DBR of said two signals obtained through an OR gate OR51 and a zero data signal GND equal to the ground potential are respectively supplied to contacts s, t, u and v of selector switches SW1-SW4 in first to fourth data selecting circuits DSC1-DSC4. Signals DSL1-DSL4 obtained from the selector switches SW1-SW4 are respectively supplied to AND gates AD41-AD44 and transmitted to driver circuits DRV1-DRV4 only during the high-level states, thereby driving the recording heads 10, 11, 20 and 21.

In the following explained is the function of the data switching circuit DSW in the representative recording modes, particularly for driving the recording heads 10, 11.

(i) Basic mode : image inside and outside the specified area on the original document are recorded without change:

When an instruction for basic mode recording is generated from the console panel COP shown in FIG. 4, the signals generated by the actuation of various switches are encoded to obtain a basic mode signal EN shown in FIG. 10. In response to said signal EN, the control circuit CL supplies signals SD1, SD2 corresponding to the basic mode respectively to the selector switches SW1, SW2, whereby said switches are respectively to the contacts s and t to supply the black readout data signal DMB to the black recording head 10 and the red readout data signal DMR to the read recording head 11. Since the presence of the specified area is ignored in this mode, the signals SD1, SD2 and the logic signals SDL1, SDL2 are made independent from the data switching control signal DOUT, and the logic signals SDL1, SDL2 are constantly maintained at the high-level state. Consequently the switches SW1, SW2 are maintained in the positions shown in FIG. 10 throughout the entire recording, and the black data signal DMB and the red data signal DMR supplied through the switches are constantly supplied to the driver circuits DRV1, DRV2 to reproduce the images on the original document without change in color.

(ii) First mode : image inside the blue frame on the original document alone are reproduced without change:

When the first mode is instructed by the console panel COP shown in FIG. 4, a first mode signal EN is supplied to the control circuit CL to generate data selecting signals SD1, SD2 for connecting the selector switches SW1, SW2 respectively to the contacts s and t. Also the data switching control signal DOUT causes the control circuit CL to generate the logic signals SDL1, SDL2 assuming the high-level state only between the detected edges on each line. Consequently in response to edge detection signals, or to the data switching control signal DOUT, the images inside the specified area are successively recorded from line to line, but the color data signals DMB, DMR outside the specified area are not reproduced.

(iii) Second mode : black-to-red and read-to-black recording for the images outside the specified area, and black-to-black and red-to-red recording for the image inside the frame:

When the second mode is instructed by the console panel COP shown in FIG. 4, a second mode signal is supplied to the control circuit CL to generate such data selection signals SD1, SD2 as to connect the switches SW1, SW2 respectively to the contacts t and s when the edge detection information is present on the data switching control signal DOUT, or to the contacts s and t when such edge detection information is absent. Also the first and second logic signals SDL1, SDL2 are constantly maintained at the high-level state. In this manner achieved are the black-to-red and red-to-black recording outside the specified area and the black-to-black and red-to-red recording inside said area.

As explained in the foregoing, the present invention provides a recording apparatus allowing exact prompt selection of various recording modes.

Although the present invention has been explained by an embodiment with various recording modes derived by a blue frame definition on an original document in black and red colors, it will be understood that the present invention is applicable also to any recording, printing or copying apparatus with plural recording modes, for example a mode with a resolution of 8 dots/mm, and a mode with a resolution of 16 dots/mm or a mode for continuous tone reproduction.

Also the aforementioned 81 recording modes may naturally be selected by 81 corresponding switches or by 18 switches, including 9 switches corresponding to the first column COL1 and other 9 switches corresponding to the second column COL2 in FIG. 2.

Furthermore the ink jet heads in the recording units may be replaced by other suitable recording elements.

Furthermore the basic recording mode may be different from that explained in the foregoing embodiment.

In the foregoing embodiment, the particular recording modes most frequently encountered are previously selected from the 81 modes for various color changes and are assinged to the specific mode switches on the console panel 300, whereby the operator can select the specific modes by actuating the specific switches instead of originary mode selecting procedure.

However the modes desired by the operator are not always same but vary depending on the jobs to office in which the apparatus of the present invention is to be used. In the following explained, therefore, is an embodiment in which the frequently used modes are not previously determined at the manufacture of the apparatus but can be arbitrarily registered by the operator.

Figure 11:
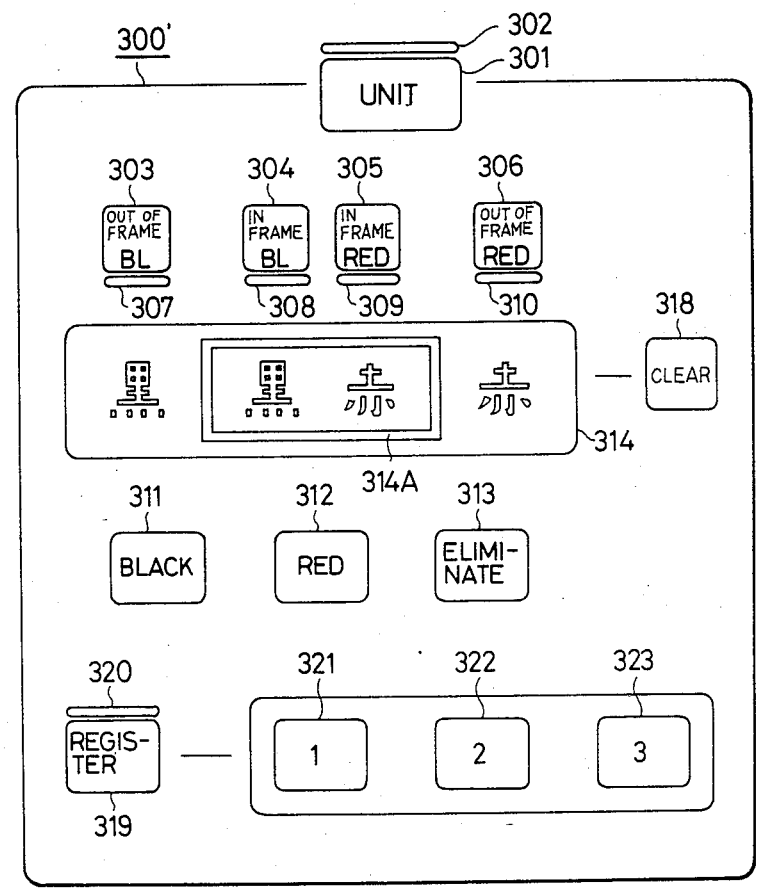
FIG. 11 is a plan view showing another example of the switch arrangement on the console panel.

FIG. 11 shows an example of a console panel 300' with such registration function for the recording modes, wherein the same components as those in FIG. 4 are represented by same numbers. More specifically the console panel 300' is different from that shown in FIG. 4 in that the specific mode switches 315-317 are replaced by registered mode selecting switches 321-323.

In FIG. 11 there are shown a registration switch 319; an indicator 320 therefor; and registered color mode selecting switches 321-323. In the present embodiment a recording mode is selected according to the aforementioned procedure and displayed on the indicator 314. By subsequent actuations of the registration switch 319 and one of the registered color mode selecting switches 321-323 in succession, the recording mode is registered corresponding to thus actuated selecting switch. In this manner the most frequently used modes can be arbitrarily assigned to registered color mode selecting switches 321-323, and the use of such programmable switches simplifies the mode selecting procedure and improves the convenience for use.

The above-described procedure with one of the selecting switches 321-323 thus registers a new recording mode, simultaneously with the erasure of the recording mode already registered for such switch.

Figure 12A:
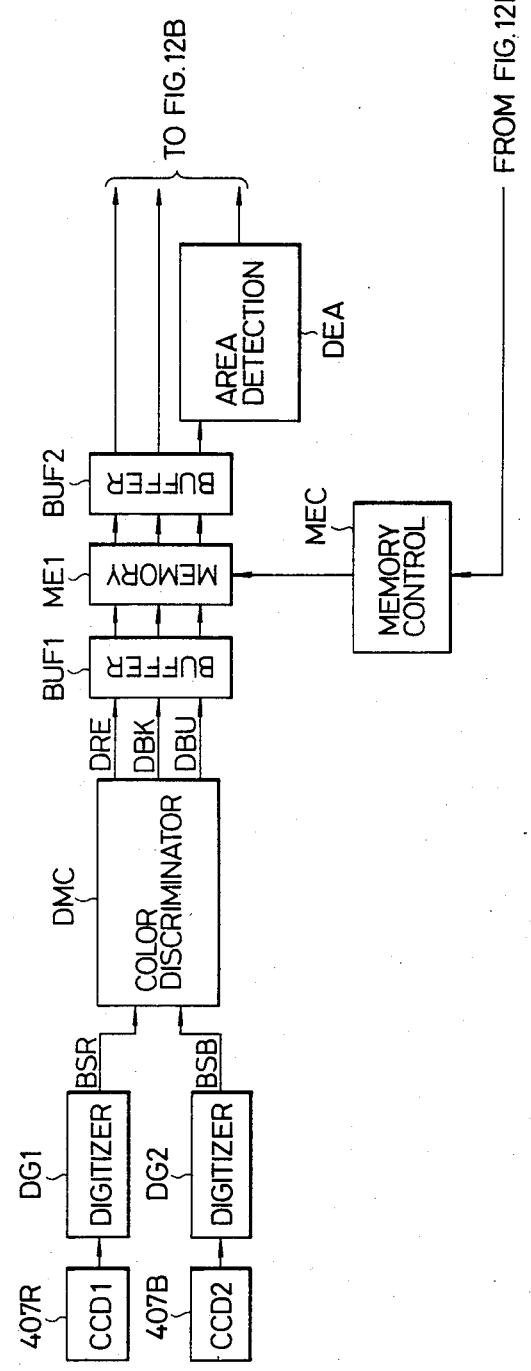
FIG. 12 composed of FIGS. 12A, 12B, 12C and 12D is a block diagram showing the control unit of the recording apparatus provided with the console panel shown in FIG. 11.
Figure 12C:
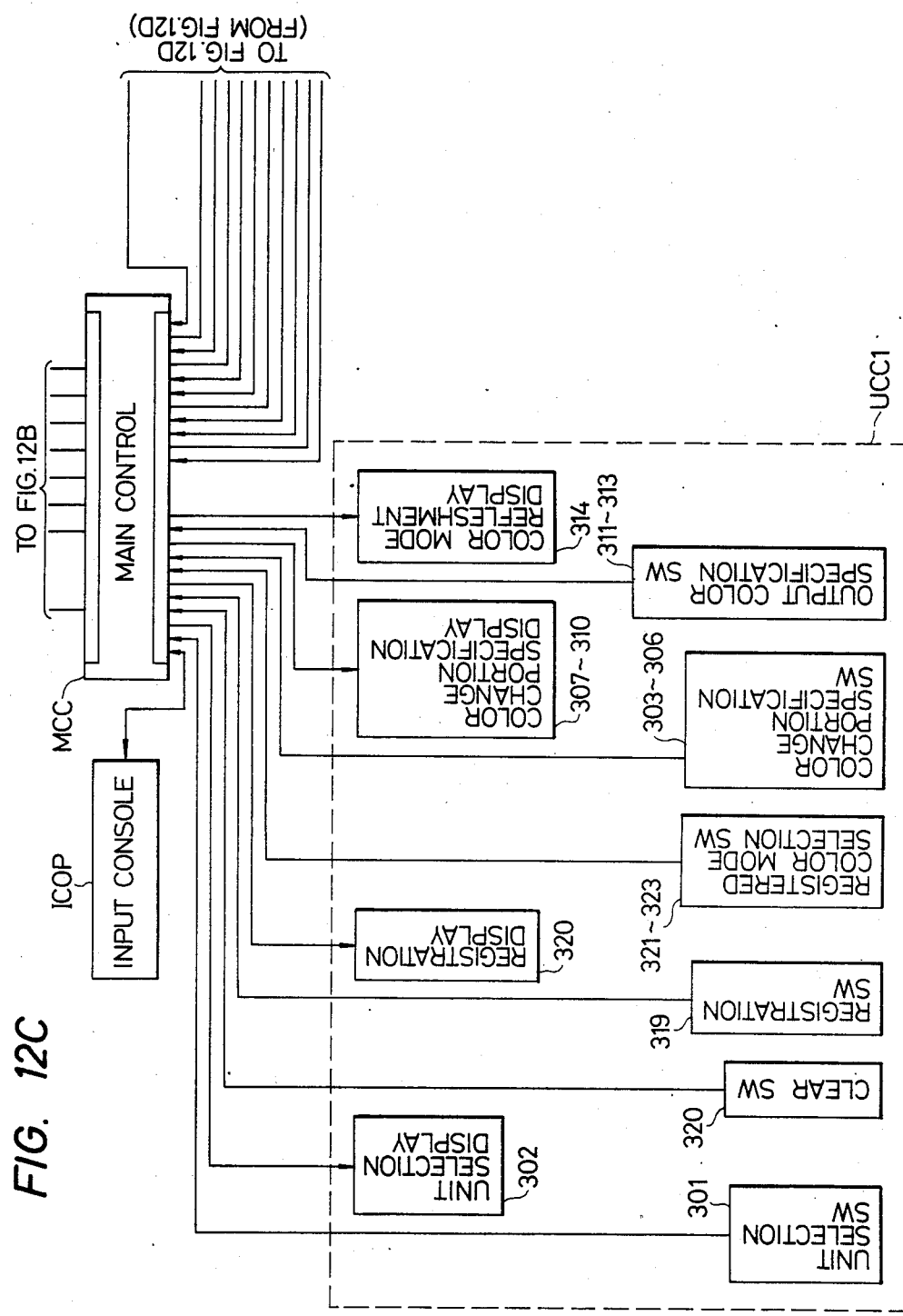
Figure 12D:
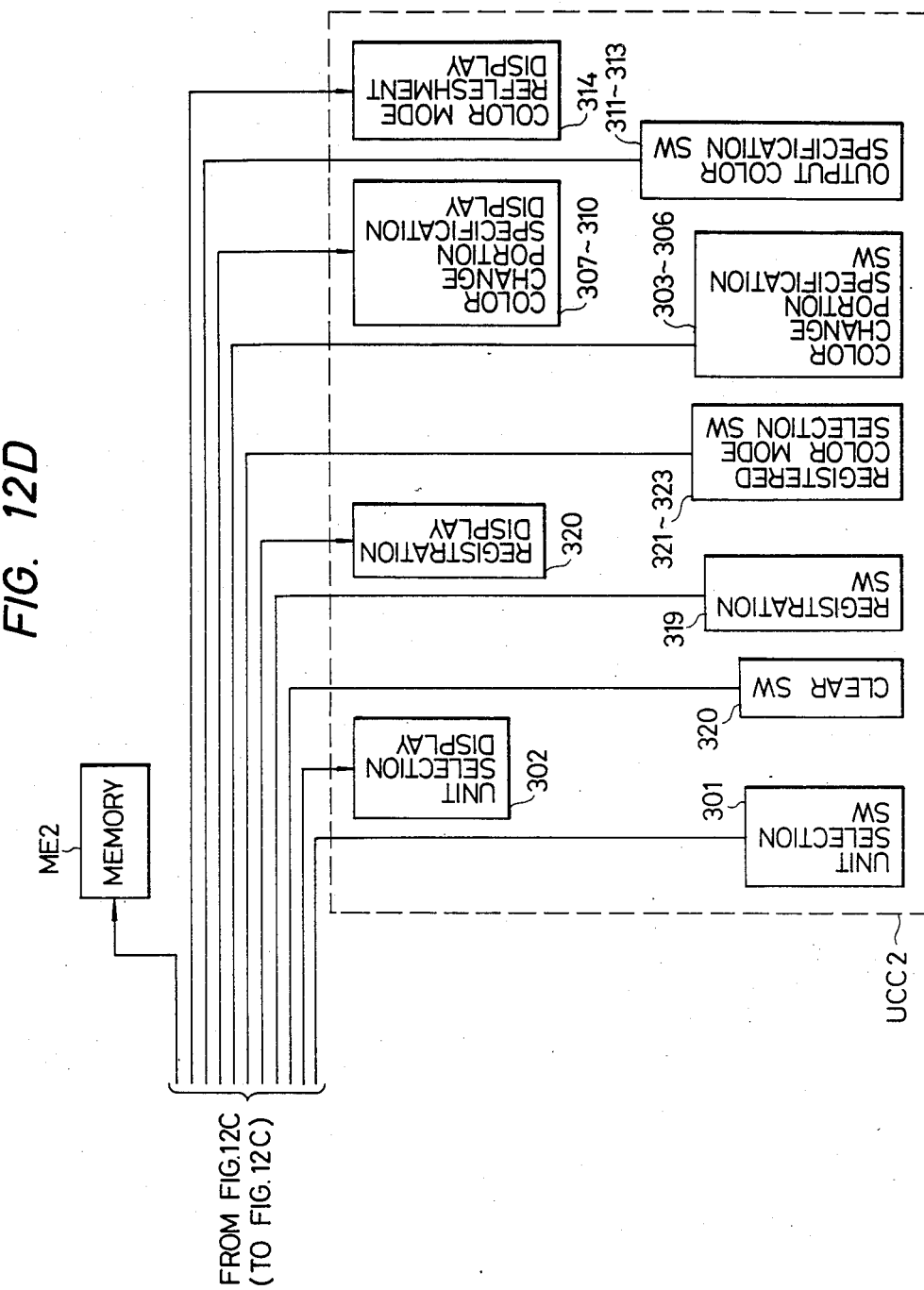

FIG. 12 shows an example of the control unit for use in the present embodiment, wherein the same components as those in FIG. 8-1 are represented by same symbols. The control unit shown in FIG. 12 is different from that shown in FIG. 8-1 in that the input control circuits UCC1, UCC2 connected to the main control circuit MCC are provided with the registration switch 319, the corresponding display 320 and the registered color mode selecting switches 321-323 in place of the specific mode switches 315-317.

The various switches provided in the input control circuits UCC1, UCC2 are connected to the main control circuit MCC, which executes the programs stored in the memory ME2 in response to the actuations of the switches as will be explained in the following in relation to FIG. 13.

Figure 13A:
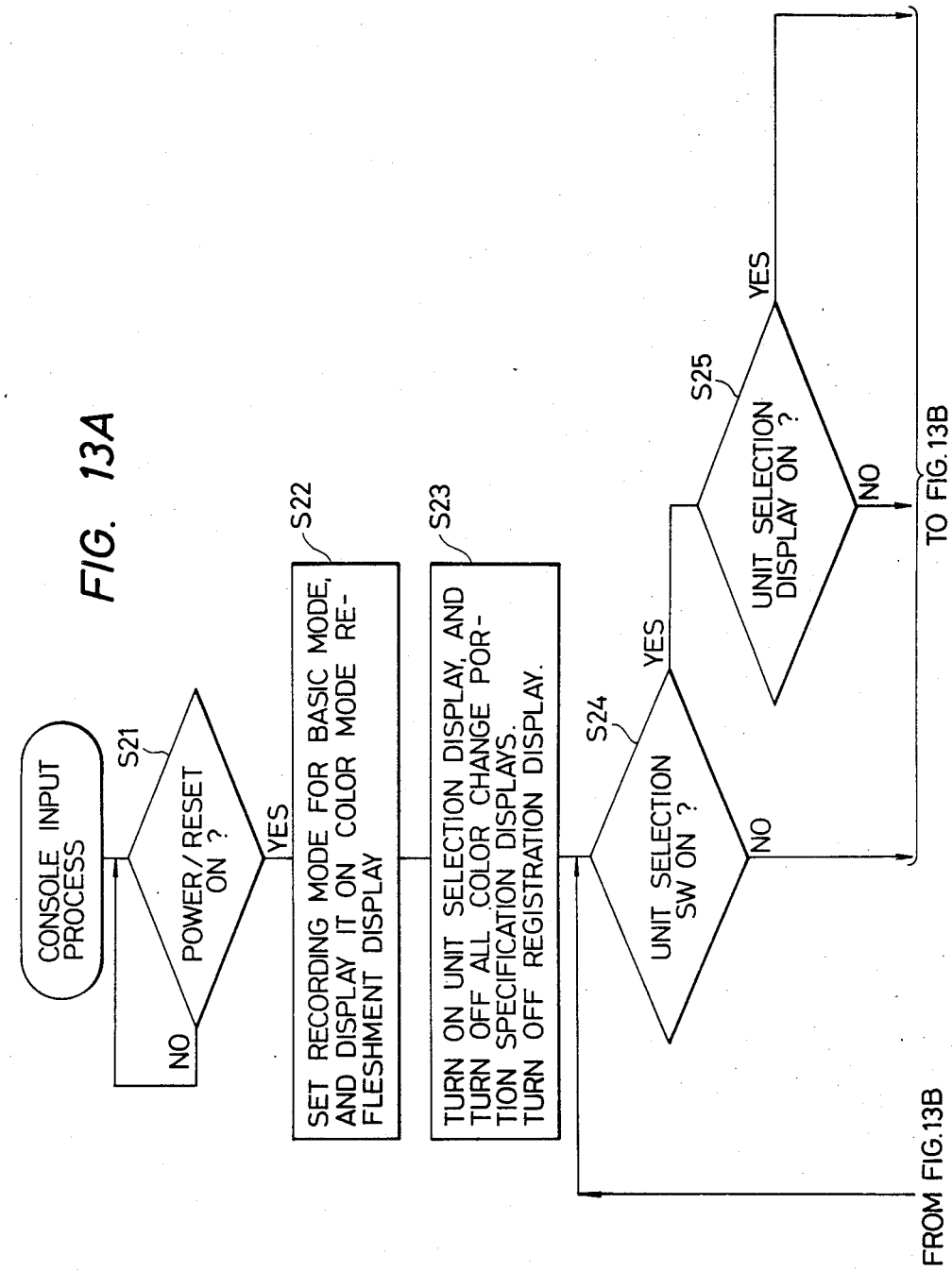
FIG. 13 composed of FIGS. 13A, 13B, 13C, 13D and 13E is a flow chart showing the control procedure in the control unit shown in FIG. 12.

FIG. 13 shows the unit console input processing procedure in the recording units 100, 200, wherein the step S21 identifies if the apparatus is powered and reset, and, if a affirmative, the step S22 sets the recording mode to the aforementioned basic mode and displays said basic mode on the mode indicator 314. Subsequently the step S23 lights the unit selection indicator 302 for the recording units (abbreviated as "unit" in FIGS. 12 and 13) and turns off the color change area indicators 307-310 and the registration display 320.

The step S24 identifies if the unit selector switch 301 is actuated, and, if affirmative, the program proceeds to the step S25 for identifying whether the unit selection indicator 302 is lighted in response to the actuation of said switch 301. If it is lighted, the step S26 turns off the unit selection indicator 302, mode indicator 314, color change area indicators 307-310 and registration display 320 and the program proceeds to the step S28. If the identification in the step S25 is negative, the step S27 is executed to light the selection indicator 302, to set the recording mode to the basic mode and to display said basic mode on the indicator and the program proceeds to the step S28.

Also in case the identification in the step S24 in negative, the step S28 is executed to identify whether the unit selection indicator 302 is lighted, and, if the negative, the program returns to the step S24. In case the identification is affirmative, the step S29 is executed to identify whether the clear switch 318 is actuated, and, if affirmative, the step S30 is executed to set the recording mode to the basic mode, to display the basic mode on the color mode indicator 314 and to turn off the color change area indicators 307-310 and the program proceeds to the step S31.

The step S31 identifies if the registration switch 319 is actuated, and, if affirmative, the step S32 is executed to identify whether the registration display 320 is lighted at said actuation. If affirmative, the step S33 turns off the registration display 320 and the program proceeds to the step S35. On the other hand, in case of negative identification in the step S32, the step S34 is executed to light the registration display 320 and the program proceeds then to the step S35.

If the identification at the step S31 is negative, the program proceeds to the step S35 for identifying whether any of the registered color mode selecting switches 321-323 is actuated. If affirmative, the step S36 identifies whether the registration display 320 is lighted at the time when switches 321-323 was actuated. If affirmative, the step S37 is executed to register the recording mode stored in a determined area of the memory ME2 corresponding to the actuated one of the registered color mode selecting switches 321-323 and to turn off the registration display 320, and the program proceeds to the step S39. In case of a negative identification at the step S36, the step S38 is executed to change the recording mode to the one stored in said memory ME2 corresponding to the actuated one of the registered color mode selecting switches and to display thus changed mode on the display and the program proceeds to the step S39.

In case the identification at the step S35 is negative, the program proceeds to the step S39 to identify whether any of the color change area selecting switches 303-306 is actuated. If affirmative, the step S40 is executed to identify one of the color change area indicator 307-310 corresponding to the actuated selecting switch is lighted. If affirmative, the program proceeds to the step S41 to turn off all the color change area indicator 307-310 and further proceeds to the step S43. Also if the identification at the step S40 is negative, the step S42 is executed to turn on one of the color change area indicators 307-310 corresponding to the actuated selecting switch and to turn off other indicators, and the program proceeds to the step S43.

In case of a negative identification at the step S39, the step S43 identifies whether one of the output color selecting switches 311-313 is actuated, and, if affirmative, the step S44 identifies whether any of the color change area indicators 307-310 is lighted. If affirmative, the program proceeds to the step S25 to change the recording color in the areas indicated by the color change area indicators 307-310 according to the actuated recording color selecting switches, to display the changed recording mode on the color mode indicator 314 and to turn off all the color change area indicators 307-310, whereupon the program returns to the S24.

As explained above, the present embodiment allows arbitrary registration of frequency used recording modes by the operator. Consequently the image recording in such modes can be achieved simply by actuation of the switches 321-323 instead of the ordinary mode selecting procedure, if such modes are once registered.

It is also possible to have the above-described registering function for the mode selected by the operator, in addition to the particular recording modes previously determined at the manufacture of the apparatus.

In this embodiment the operator can visually confirm the registered mode since the recording mode changed by the selecting switches 321-323 is displayed on the indicator 314.

As explained in the foregoing the recording apparatus shown in FIG. 1 is provided with two recording units 100, 200, which are simultaneously driven for reducing the recording time in case plural records are produced from a same original document or same information.

In the following explained is an embodiment with plural recording units, in which, if one of the recording units develops a failure during simultaneous operation of said plural units, the operations to be performed by such failed unit can be performed by other recording units.

Figure 14:
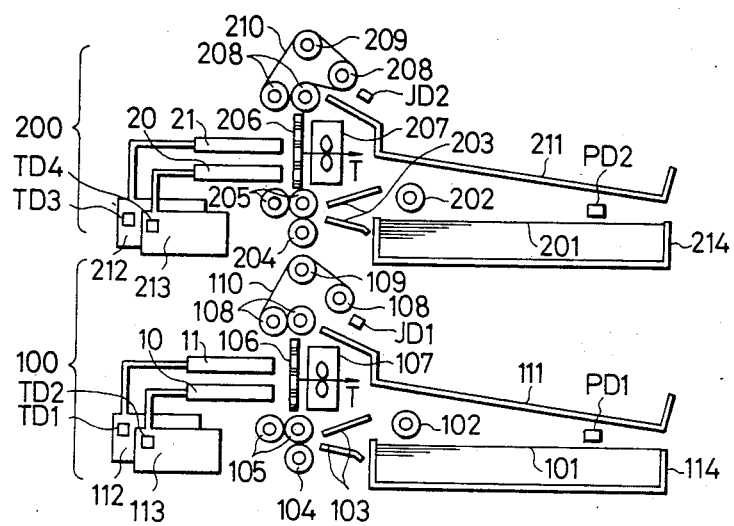
FIG. 14 is a detailed view showing another embodiment of the recording unit.

FIG. 14 shows such embodiment in which the recording operation is conducted in the same manner as explained in relation to FIG. 6, and the same components as those in FIG. 6 are represented by same numbers.

In FIG. 14 there are provided paper absence detector PD1, PD2 adapted for detecting the presence of recording sheets respectively in the sheet cassettes 114, 214 and generating a paper absence signal in case the recording sheet is not present in the corresponding cassette or the cassette 114 or 214 is not properly positioned.

Jam detectors JD1, JD2 detect the recording sheets advanced from the cassettes 114, 214 by the feed rollers 102, 202 to the registering rollers 104, 204 and further transported to the sheet trays 111, 211 by the transport rollers 108, 208, and identifies a jamming in case the recording sheet is not detected by the corresponding jam detector within a determined period from the start of the registering roller 104 or 204.

Ink absence detectors TD1, TD2, TD3, TD4 respectively detect the ink amount in the ink tanks 112, 113, 212, 213 and generate ink absence signals if said tanks are empty.

Figure 15A:
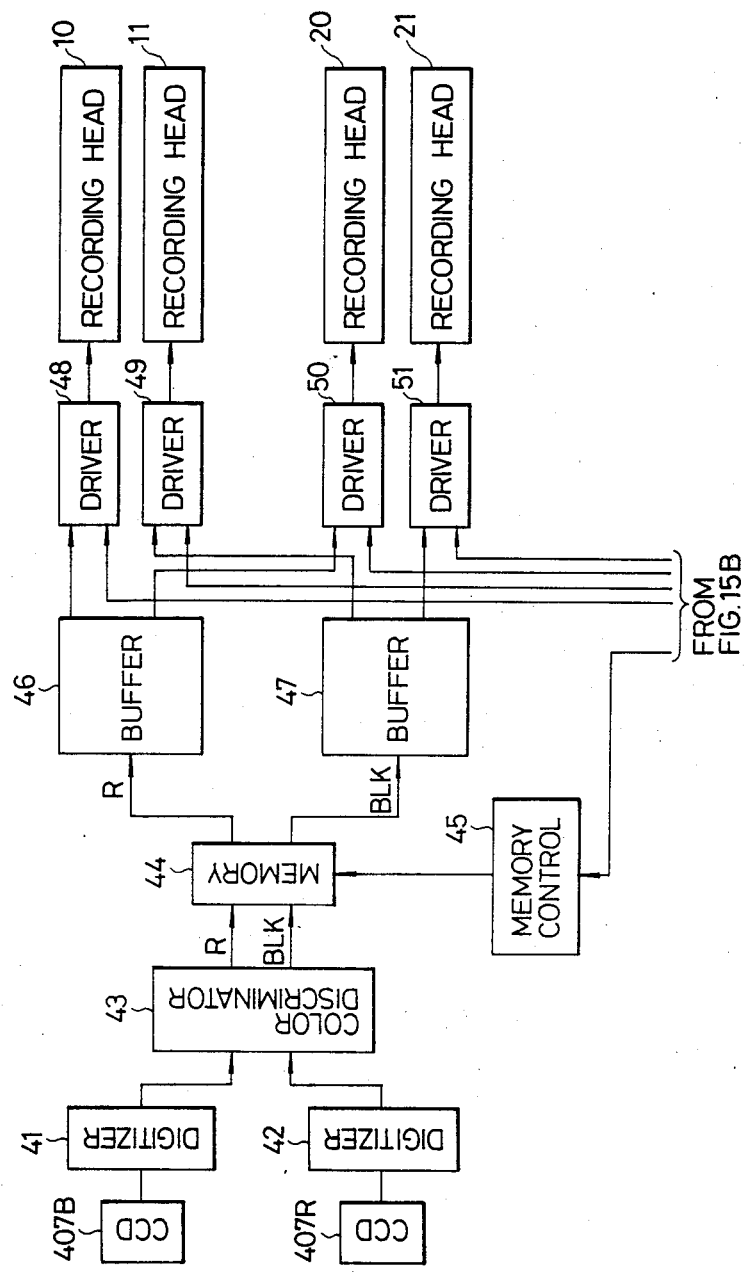
FIG. 15 composed of FIGS. 15A and 15B is a block diagram showing the control unit employed in the recording apparatus shown in FIG. 14.
Figure 15B:
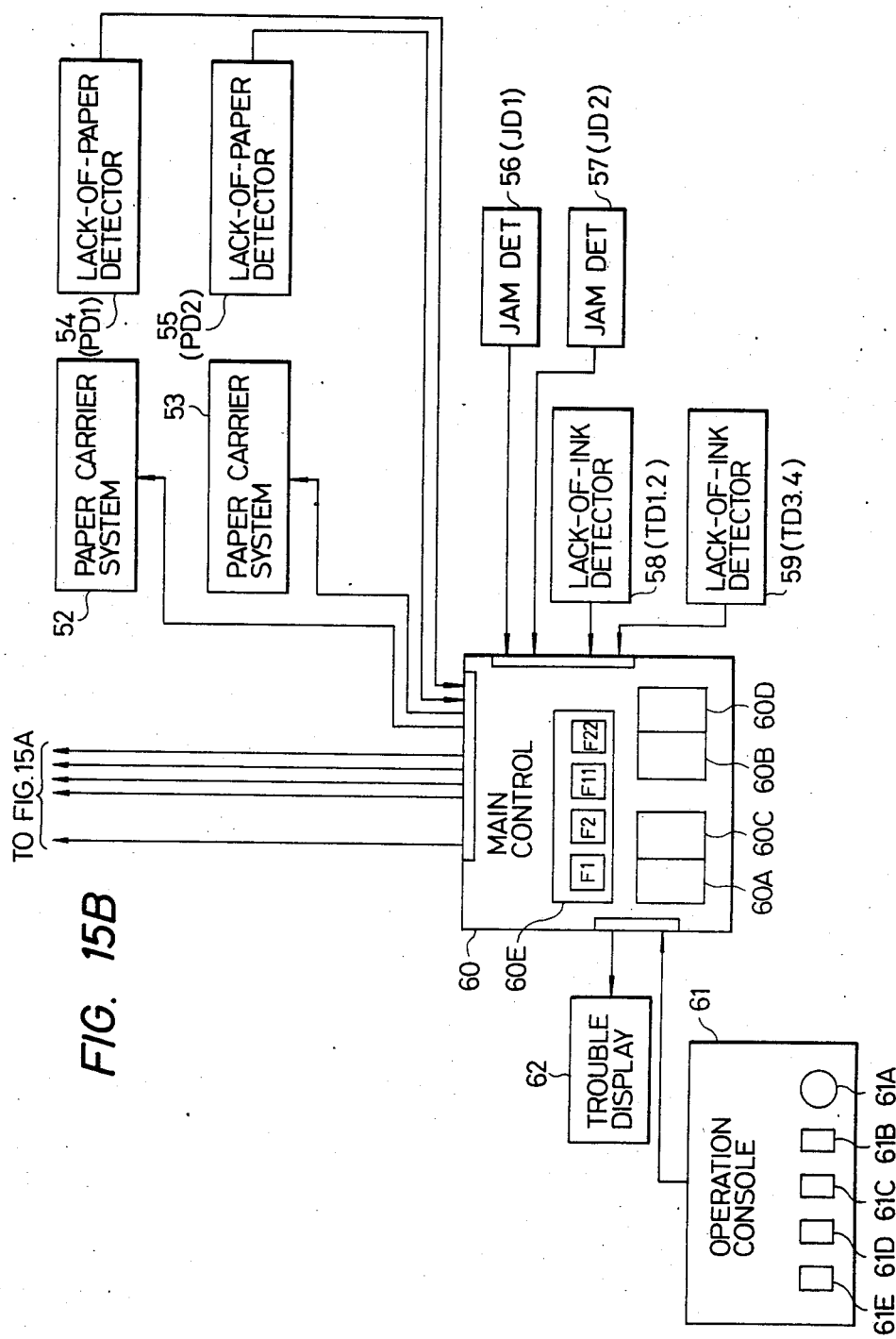

FIG. 15 shows an example of the control circuit for the recording apparatus shown in FIG. 14, wherein provided are charge-coupled devices 407B, 407R explained before; digitizing circuits 41, 42; a color discriminating circuit 43; a read-write memory 44; a memory control circuit 45; buffer circuits 46, 47; driver circuits 48-51; black and red recording heads 10, 11 provided in a first recording unit 100; black and red recording heads 20, 21 provided in a second recording unit 200; a paper drive system 52 in the recording unit 100; a paper drive system 53 in the recording unit 200; paper absence detectors 54, 55 (PD1, PD2) provided corresponding to sheet cassettes 115, 215 in said recording units; jam detectors 56, 57 (JD1, JD2) for respectively detecting sheet jamming in the paper drive systems 52, 53; and ink absence detectors 58, 59 (TD1, TD2, TD3, TD4) for detecting the absence of ink in the ink tanks 112, 113, 212, 213. A main control circuit 60 composed of a microcomputer for controlling the entire electric circuits and mechanisms is provided with copy counters 60A, 60B and copy mode registers 60C, 60D to be explained later. A control panel 61 provided on the input console 500 shown in FIG. 1 is provided with a dial 61A for setting the number of recording operations; a start button 61B for instructing the start of recording operation; a selector switch 61C for selecting the recording units; mode selecting switches 61D, 61E etc. for selecting either black or red recording in each of the recording units 100, 200; and a trouble indicator 62 for indicating the nature and position of trouble.

In the circuit shown in FIG. 15, the image data read by the charge-coupled devices 407B, 407R are respectively digitized by the digitizing circuits 41, 42, and thus digitized data are subjected to the discrimination of black and red in the same manner as explained in relation to FIG. 8-1.

Thus obtained black data BLK and red data R are stored in the memory 44, of which capacity may be arbitrarily selected within a range from a small capacity such as of a line memory to a large capacity such as of a page memory. Consequently the image recording may be effected simultaneously with the image reading, or after one or several pages of the original are once stored in the memory 44. The memory control circuit 45, controlled by the main control circuit 60, generates the read/write signals, addressing signals and timing signals for said memory 44.

The image data BLK, R stored in said memory 44 are supplied, under the control by the memory control circuit 45, to the buffer circuits 46, 47 and then respectively to the black recording heads 10, 20 and red recording heads 11, 21. The driver circuits 48-51 are on-off controlled by the control circuit 60. More specifically the recording is achieved, under the control by the control circuit 60, by the recording unit selected by the recording unit selecting switch 61C on the control panel 61. In case a black recording mode is selected by the mode selecting switch 61D on said panel 61, the main control circuit 60 sets said mode in the copy mode register 60C to activate the black recording head of the recording unit 100, thus achieving black recording on the recording sheet transported thereto. Also in case a black-red recording mode is selected by the switch 61D, recording heads 10, 11 are both activated to effect the image recording in black and red colors. Similarly the switch 61E selects the recording modes in the recording unit 200.

The disabled states of the recording apparatus are detected by the paper absence detectors 54, 55, ink absence detectors 58, 59 and jam detectors 56, 57.

Figure 16D:
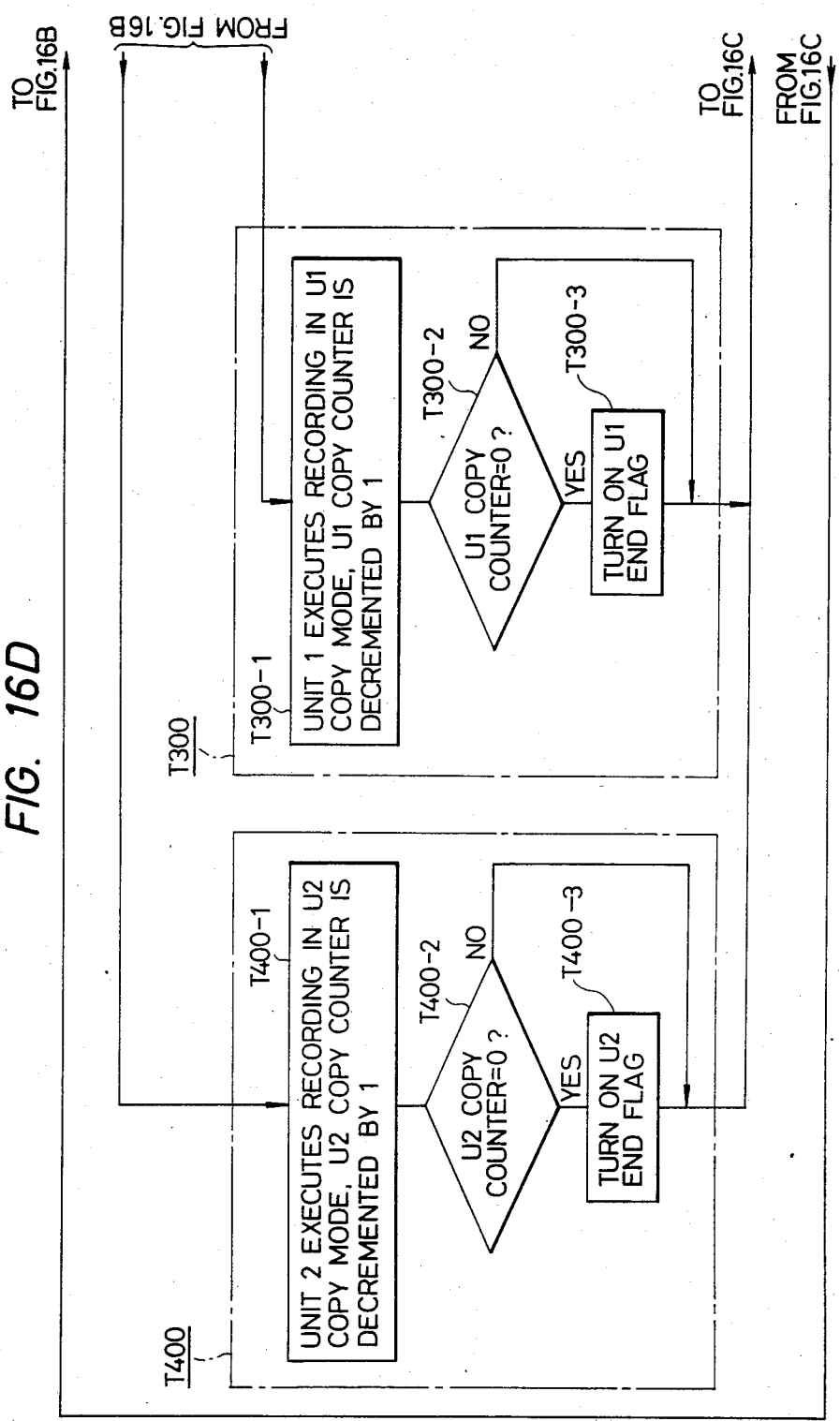
FIG. 16 composed of FIGS. 16A, 16B, 16C, 16D, 16E and 16F is a flow chart showing the control procedure in the control unit shown in FIG. 15.
Figure 16E:
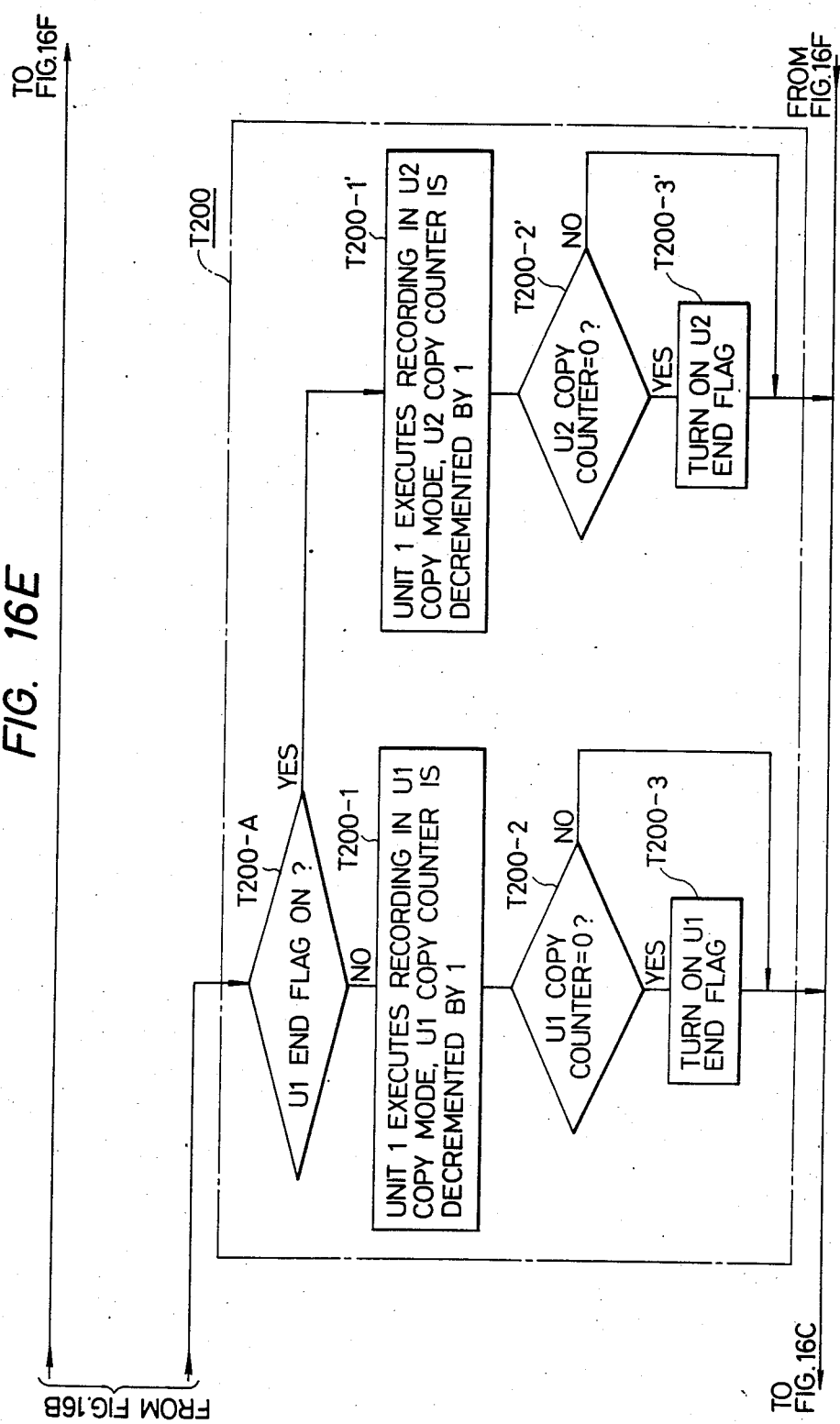
Figure 16F:
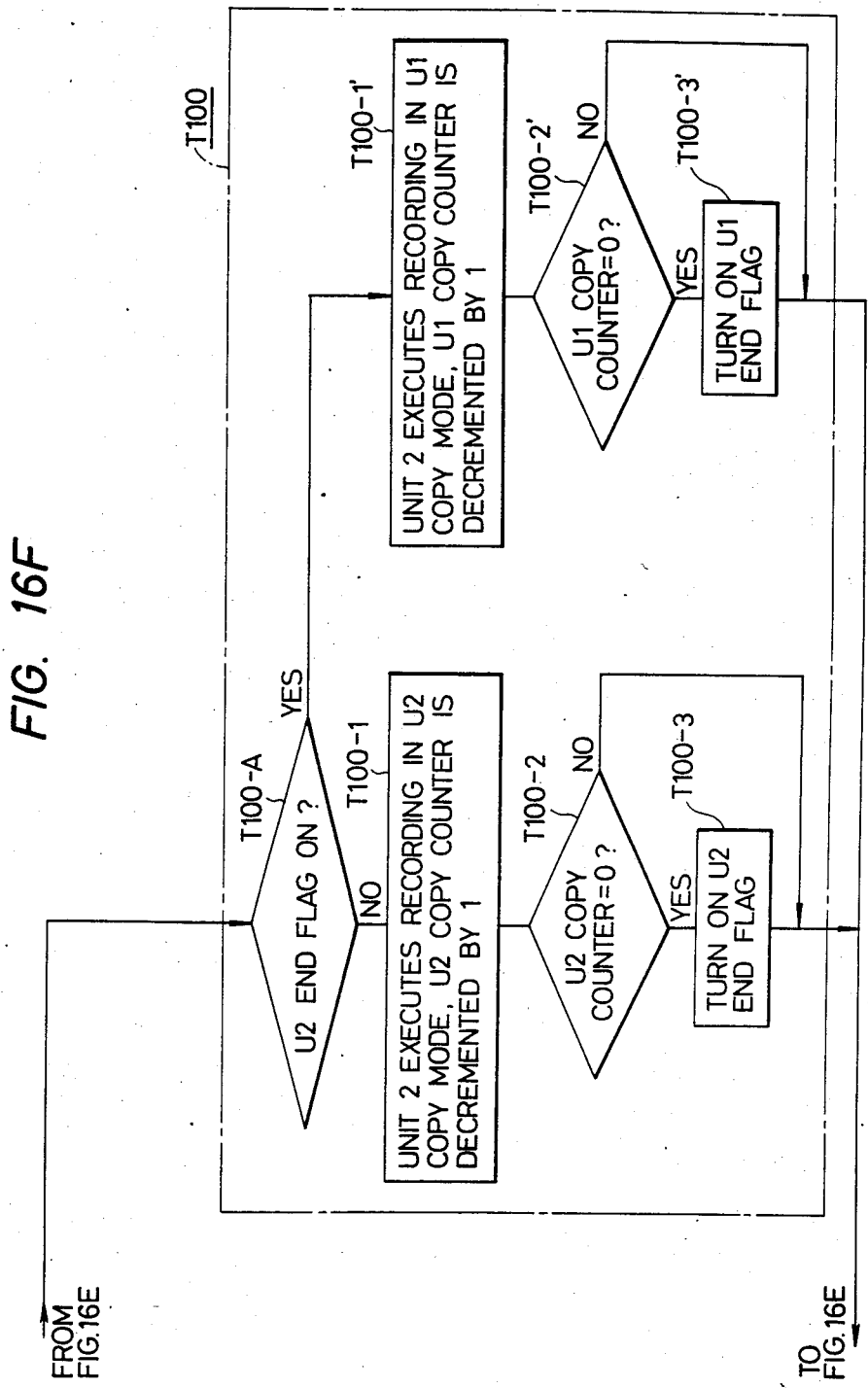

Now the control procedure of the present embodiment will be explained in the following, in reference to the flow chart shown in FIG. 16.

In the following explained, as an example, is a case of producing three black-red records in the unit 100 and two black records in the unit 200. It is to be noted that said recording units 100, 200 are represented as U1, U2 in said flow chart. At first the selector switch 61C, mode selecting switches 61D, 61E and dial 61A on the panel 61 are manipulated to select the recording units 100, 200, and to instruct the black-red recording mode in the unit 100, black recording mode in the unit 200, production of 3 records in the unit 100 and production of 2 records in the unit 200. The step T1 identifies the selection of the recording unit 100, and the step T2 sets the instructed copy number ("3 copies") and the instructed recording mode ("black-red") respectively the copy counter 60A and the copy mode register 60C in the control circuit 60. The memory 60E in said control circuit 60 is provided with end flag areas F1, F2 and trouble flag area F11, F22 corresponding to the recording units. The step T3 clears the end flag F1 and the trouble flag F11 corresponding to the unit 100 and the program proceeds to the step T4. In case the recording unit 100 is not selected, the program proceeds from the step T1 to the step T3' for resetting the flags F1, F11 and then to said step T4.

In the steps T4, T5, T6 and T6' the copy number and recording mode for the recording unit 200 are set in the copy counter 60B and copy mode register 60D and the flags F2, F22 are reset in the same manner as explained above. The step T7 identifies that the flags F1, F11 are not in the set state. The step T8 reads the trouble signals from the detectors 54-59 and sets the trouble flags F11, F22 corresponding to the recording units disabled by the troubles such as the absence of recording sheets. If the step T9 identifies that the flags F11, F22 for both recording units are set, indicating the disabled recording operation, the program proceeds along the YES branch to display the nature and location of the troubles on the trouble indicator 62. In case the flag F11 alone is set, indicating that the recording unit 100 is disabled, the program proceeds from the step T10 along the YES branch to the procedure T100. On the other hand, if the flag F22 alone is set, indicating that the recording unit 200 is disabled, the program proceeds from the step T11 to the procedure T200. The flags F11, F22 for both recording units 100, 200 are not set, the program proceeds through the steps T10, T11 along NO branch. As the end flags F1, F2 are both not set, the program passes through the steps T12, T13 along the NO branch to the step T14 for effecting the image recording in the recording units 100, 200 in the instructed recording modes, i.e. in the black-red recording mode and the black recording mode, respectively. After the completion of recording the content of the copy counters 60A, 60B for the recording units 100, 200 is step reduced, and the program proceeds through the steps T15, T17 and T19 along the NO branch to the step T8, thus repeating the above-described procedure.

As the content of the copy counter 60B for the recording unit 200 becomes zero after the completion of second copy in the step T14, the program proceeds from the step T17 along the YES branch, and the step T18 sets the end flag F2, indicating that the recording of an instructed number ("2" in this case) by the recording unit 200 is completed. The program however returns from the step T19 to the step T8, since the flag F1 is not yet set. Then, since the end flag F2 is already set, the program proceeds from the step T3 along the YES branch to the procedure T300 for conducting the image recording by the recording unit 100 alone. After the end of recording the content of the copy counter 60A is step reduced in the step T300-1. As the result of said reduction said content becomes equal to zero, indicating the completion of recording operation in the recording unit 100 (step T300-2), whereby the end flag F1 is set in the step T300-3 and the program proceeds to the step T19.

Upon identification of the set state of the end flags F1, F2 in the step T19, the program proceeds to the step T20 to check the trouble flags F11, F22 and to display the disabled recording unit on the indicator 62 if any trouble flag is present. In case the flags F11, F22 are both not set, the program proceeds along the YES branch to terminate the recording operation.

Now there will be given an explanation on a case in which a recording unit is disabled by a trouble such as sheet jamming. It is again assumed that 3 and 2 copies are respectively made by the recording units 100, 200. In case the step T8 identifies a trouble in the recording unit 100 and sets the trouble flag F11 after the completion of one copying cycle in each recording unit, the program proceeds from the step T10 along the YES branch to the procedure T100, in which the step T100-A identifies whether the recording unit 200 is capable of recording operation. In the present example the end flag F2 is not set, indicating that the recording unit 200 is still in the course of recording operation. Consequently the program proceeds along the NO branch through the steps T100-1, T100-2 and T100-3, thus completing the recording operation in the recording unit 200, in the same manner as in the aforementioned steps T300-1, T300-2 and T300-3.

After the setting of the end flag F2 in said step T100-3, the program proceeds from the step T19 through the step T8 to the procedure T100 again. However the presence of the end flag F2 indicating the completion of recording operation by the recording unit 200 is detected this time, and the program proceeds to the step T100-1, to cause the recording unit 200 to effect the recording operation interrupted in the recording unit 100. More specifically the operation is effected in the black-red recording mode specified by the copy mode register 60C, for two copies stored in the copy counter 60A. At the end of each recording operation the content of the copy counter 60A is step reduced. After the second recording operation the content becomes equal to zero in the step T100-2', whereby the end flag F1 is set in the step T100-3'. In this manner the records of a desired number can be obtained according to the previously selected modes without interruption in the recording operation, even when the recording unit 100 is used for providing the desired recordings according to the procedure T200 similar to the above-described procedure T100.

In the foregoing explained is a case of selecting both recording units 100, 200 simultaneously for recording, but it is also possible, in case of a failure in a singly selected recording unit, to activate other recording units to continue the remaining operation.

As explained in the foregoing, the present invention provide a recording apparatus provided with plural recording units for independent recording modes and for independent numbers of recording operations, in which the interrupted recording operation in a recording unit due to a failure in the course of recording operation can be continued in another recording unit under the conditions specified for such failed recording unit. In this manner it is rendered possible to obtain desired number of records under the predetermined conditions without being affected by troubles in the recording units.

Although the selection of recording units and recording modes in the present embodiment is made from the console 61, it is also possible to make such selections from the console panel 300 provided on the recording units as shown in FIG. 1.

Also the plural recording units need not necessarily be superposed vertically.

What we claim is:

1. An image recording apparatus comprising:
   means for setting a color recording mode for a desired color image recording;
   means for registering different color recording modes set from said setting means;
   means for selecting one of the plurality of color recording modes registered in said registering means; and
   means for recording a color image on a recording material in accordance with the color recording mode read out from said registering means based on selection by said selecting means.

2. An image recording apparatus according to claim 1, wherein said mode setting means sets recording colors of the image.

3. An image recording apparatus according to claim 1, wherein said mode setting means comprises plural keys, wherein the setting of said recording mode is effected by plural actuations of said keys.

4. An image recording apparatus according to claim 1, wherein said selecting means has a plurality of operative members each manually operable and corresponding to an associated one of said plurality of color recording modes registered in said registering means, and wherein said selecting means selects the color recording mode corresponding to the associated one of said operative members when manually operated.

5. An image recording apparatus according to claim 1, further comprising means for displaying the color recording mode selected by said selecting means.

6. An image recording apparatus according to claim 1, further comprising means for entering image data for color image recording, wherein said recording means performs the color image recording based on the image data entered via said entering means in accordance with the selected color recording mode.

7. An image recording apparatus according to claim 6, wherein said entering means includes reading means for reading a color document to generate color image data.

8. An image recording apparatus according to claim 1, wherein said recording means is operable to record the image with red and black colors.

9. An image recording apparatus according to claim 1, wherein said recording means is operable to record the image by means of ejection of ink on the recording material.

10. An image recording apparatus comprising:
    mode setting means for setting a color recording mode for a desired color image recording in accordance with a predetermined procedure;
    mode registering means for registering a plurality of color recording modes;
    mode selecting means for selecting one of said plurality of color recording modes registered in said mode registering means; and
    recording means for recording a color image on a recording material in accordance with the color recording mode set by said mode setting means or the color recording mode selected by said selecting means.

11. An image recording apparatus according to claim 10, wherein said mode setting means sets the recording colors of the image.

12. An image recording apparatus according to claim 10, wherein said selecting means has a plurality of operative members each manually operable and corresponding to an associated one of said plurality of color recording mdoes registered in said registering means, and wherein said selecting means selects the color recording mode corresponding to the associated one of said operative members when manually operated.

13. An image recording apparatus according to claim 10, further comprising means for displaying the specific color recording mode selected by said mode selecting means.

14. An image recording apparatus according to claim 10, further comprising means for entering image data for color image recording, wherein said recording means performs the color image recording based on the image data entered via said entering means in accordance with the selected color recording mode.

15. An image recording apparatus according to claim 10, wherein the specific color recording modes registered in said mode registering means are changeable.

16. An image recording apparatus according to claim 1, further comprising reading means for reading a color document to generate color image data, wherein said recording means records the color image based on the color image data from said reading means.

17. An image recording apparatus according to claim 10, wherein said recording means is operable to record the image with red and black colors.

18. An image recording apparatus according to claim 10, wherein said recording means is operable to record the image by means of ejection of ink on the recording material.

19. An image recording apparatus comprising:
  means for discriminating an arbitrarily specified image area of an original;
  means for setting mutually different color image recording modes for the specified image area and an image area other than the specified image area;
  means for graphically displaying the respective color image modes recording for every image area in accordance with the mode setting by said setting means; and
  means for recording on a recording material the images for the image area discriminated by said discriminating means and the image area other than the specified image area with mutually different colors in accordance with the mutually different color image recording modes set by said mode setting means.

20. An image recording apparatus according to claim 19, wherein said image recording means is adapted for image recording with plural colors, and said display means is adapted to display the recording colors.

21. An image recording apparatus according to claim 20, wherein said display means is adapted to display the recording colors for the specified area and the area other than the specified area.

22. An image recording apparatus according to claim 19, further comprising means for entering image data for image recording, wherein said recording means performs the image recording based on the image data entered from said entering means.

23. An image recording apparatus according to claim 22, wherein said entering means includes reading means for reading a color document to generate color image data.

24. An image recording apparatus according to claim 22, wherein said recording means is operable to record the image by means of ejection of ink on the recording material.

25. An image recording apparatus according to claim 19, wherein said recording means is operable to record the image with red and black colors.

\* \* \* \* \*

UNITED STATES PATENT AND TRADEMARK OFFICE
CERTIFICATE OF CORRECTION

PATENT NO. : 4,707,713　　　　　　　　　　Page 1 of 3
DATED : November 17, 1987
INVENTOR(S) : NAOKI AYATA, ET AL.

It is certified that error appears in the above-identified patent and that said Letters Patent is hereby corrected as shown below:

AT [56] IN THE REFERENCES

"Kishi . . . . 355/141 R" should read
--Kishi . . . . 355/14 R--.

COLUMN 2

Line 31, "perpsective" should read --perspective--.

COLUMN 3

Line 7, "showing" should read --shows--.

COLUMN 5

Line 31, "Ihe" should read --The--.

COLUMN 6

Line 17, "to." should read --to--.

COLUMN 9

Line 12, "it lighted," should read --it is lighted,--.

COLUMN 10

Line 13, "selector" should read --selector--.
Line 34, "are respectively" should read --are connected respectively--.
Line 67, "read-to-black" should read --red-to-black--.

UNITED STATES PATENT AND TRADEMARK OFFICE
CERTIFICATE OF CORRECTION

PATENT NO. : 4,707,713
DATED : November 17, 1987
INVENTOR(S) : NAOKI AYATA, ET AL.

It is certified that error appears in the above-identified patent and that said Letters Patent is hereby corrected as shown below:

COLUMN 11

Line 40, "assigned" should read --assigned--.
    Line 45, "to office" should read --or office--.

COLUMN 13

Line 4, "was" should read --were--.
    Line 21, "indicator" should read --indicators--.
    Line 24, "indicator" should read --indicators--.
    Line 42, "the S24." should read --the step S24.--.
    Line 44, "frequency" should read --frequently--.

COLUMN 15

Line 47, "area" should read --areas--.

COLUMN 16

Line 5, "The" should read --If the--.
    Line 7, "along NO" should read --along the NO--.

COLUMN 17

Line 22, "provide" should read --provides--.

COLUMN 18

Line 42, mdoes" should read --modes--.
    Line 60, "1," should read --10,--.

UNITED STATES PATENT AND TRADEMARK OFFICE
CERTIFICATE OF CORRECTION

PATENT NO. : 4,707,713

DATED : November 17, 1987

INVENTOR(S) : NAOKI AYATA, ET AL.

Page 3 of 3

It is certified that error appears in the above-identified patent and that said Letters Patent is hereby corrected as shown below:

COLUMN 19

Line 11, "modes recording" should read --recording modes--.

Signed and Sealed this

Twelfth Day of April, 1988

Attest:

DONALD J. QUIGG

*Attesting Officer*  *Commissioner of Patents and Trademarks*